(12) United States Patent
Noguchi et al.

(10) Patent No.: US 11,269,462 B2
(45) Date of Patent: Mar. 8, 2022

(54) ELECTROSTATIC CAPACITANCE-TYPE SENSOR-EQUIPPED DISPLAY DEVICE AND METHOD OF DRIVING THE SAME

(71) Applicant: Japan Display Inc., Tokyo (JP)

(72) Inventors: Koji Noguchi, Tokyo (JP); Koji Ishizaki, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/201,475

(22) Filed: Nov. 27, 2018

(65) Prior Publication Data

US 2019/0107914 A1 Apr. 11, 2019

Related U.S. Application Data

(63) Continuation of application No. 14/609,990, filed on Jan. 30, 2015, now Pat. No. 10,168,819.

(30) Foreign Application Priority Data

Jan. 31, 2014 (JP) ................................ 2014-017112

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/04164* (2019.05); *G06F 3/04166* (2019.05); *G06F 2203/04103* (2013.01)

(58) Field of Classification Search
CPC ...... G06F 3/044; G06F 3/0416; G06F 3/0412; G06F 2203/04103
See application file for complete search history.

(56) References Cited

U.S. PATENT DOCUMENTS

2008/0129898 A1 6/2008 Moon
2010/0026661 A1* 2/2010 Teramoto ................ G06F 3/044
345/174

(Continued)

FOREIGN PATENT DOCUMENTS

CN 101901073 A 12/2010
CN 102402356 A 4/2012

(Continued)

OTHER PUBLICATIONS

Office Action from Chinese Patent Office for Application No. 2015-10045437.1 dated May 26, 2017.

(Continued)

*Primary Examiner* — Sahlu Okebato
(74) *Attorney, Agent, or Firm* — Michael Best & Friedrich LLP

(57) ABSTRACT

According to one embodiment, an electrostatic capacitance-type sensor-equipped display device includes a display panel with a display surface which displays an image. The sensor includes a plurality of detection electrodes disposed in a matrix, the detection electrodes being mutually electrically independently provided above the display surface and being configured to detect a variation in electrostatic capacitance, and a plurality of lead lines provided above the display surface, connected to the detection electrodes in a one-to-one correspondence, and formed of a metal.

8 Claims, 24 Drawing Sheets

(56) References Cited

U.S. PATENT DOCUMENTS

| | | |
|---|---|---|
| 2010/0328268 A1 | 12/2010 | Teranishi et al. |
| 2011/0134076 A1 | 6/2011 | Kida et al. |
| 2012/0062511 A1 | 3/2012 | Ishizaki et al. |
| 2012/0188200 A1 | 7/2012 | Roziere |
| 2012/0247937 A1 | 10/2012 | Saito et al. |
| 2013/0021295 A1* | 1/2013 | Kimura ............ G02F 1/13338 345/174 |
| 2013/0050130 A1 | 2/2013 | Brown |
| 2013/0093721 A1 | 4/2013 | Nakamura |
| 2013/0162570 A1 | 6/2013 | Shin et al. |
| 2013/0201122 A1 | 8/2013 | Kurashima et al. |
| 2014/0043280 A1* | 2/2014 | Cok ............ G06F 3/044 345/174 |
| 2014/0152617 A1 | 6/2014 | Kida |
| 2014/0198264 A1 | 7/2014 | Gao et al. |
| 2014/0347321 A1 | 11/2014 | Roziere |
| 2014/0362010 A1* | 12/2014 | Liu ............ G06F 3/0418 345/173 |
| 2015/0084912 A1* | 3/2015 | Seo ............ G06F 3/0412 345/174 |
| 2015/0160765 A1 | 6/2015 | Satou |
| 2015/0177885 A1 | 6/2015 | Noto |
| 2016/0018929 A1* | 1/2016 | Kida ............ G06F 3/047 345/174 |

FOREIGN PATENT DOCUMENTS

| | | |
|---|---|---|
| CN | 102650916 A | 8/2012 |
| CN | 102736779 A | 10/2012 |
| CN | 202649986 U | 1/2013 |
| CN | 202815780 U | 3/2013 |
| CN | 103034380 A | 4/2013 |
| CN | 103164058 A | 6/2013 |
| CN | 103176302 A | 6/2013 |
| CN | 103294321 A | 9/2013 |
| CN | 103513479 A | 1/2014 |
| JP | 2013-501287 A | 1/2013 |
| KR | 10-2012-0014808 A | 2/2012 |
| KR | 10-2013-0122907 A | 11/2013 |
| TW | 201236127 A | 9/2012 |
| TW | 201326998 A | 7/2013 |
| WO | WO-2011/015794 A1 | 2/2011 |

OTHER PUBLICATIONS

Communication from Taiwan Patent Office for Application No. 104102754 dated Feb. 24, 2017.
Korean Office Action dated Dec. 21, 2015 for corresponding Korean Patent Application No. 10-2015-0013418.
Chinese Office Action dated Feb. 19, 2021 for the corresponding Chinese Application No. 201711333891.2.

* cited by examiner

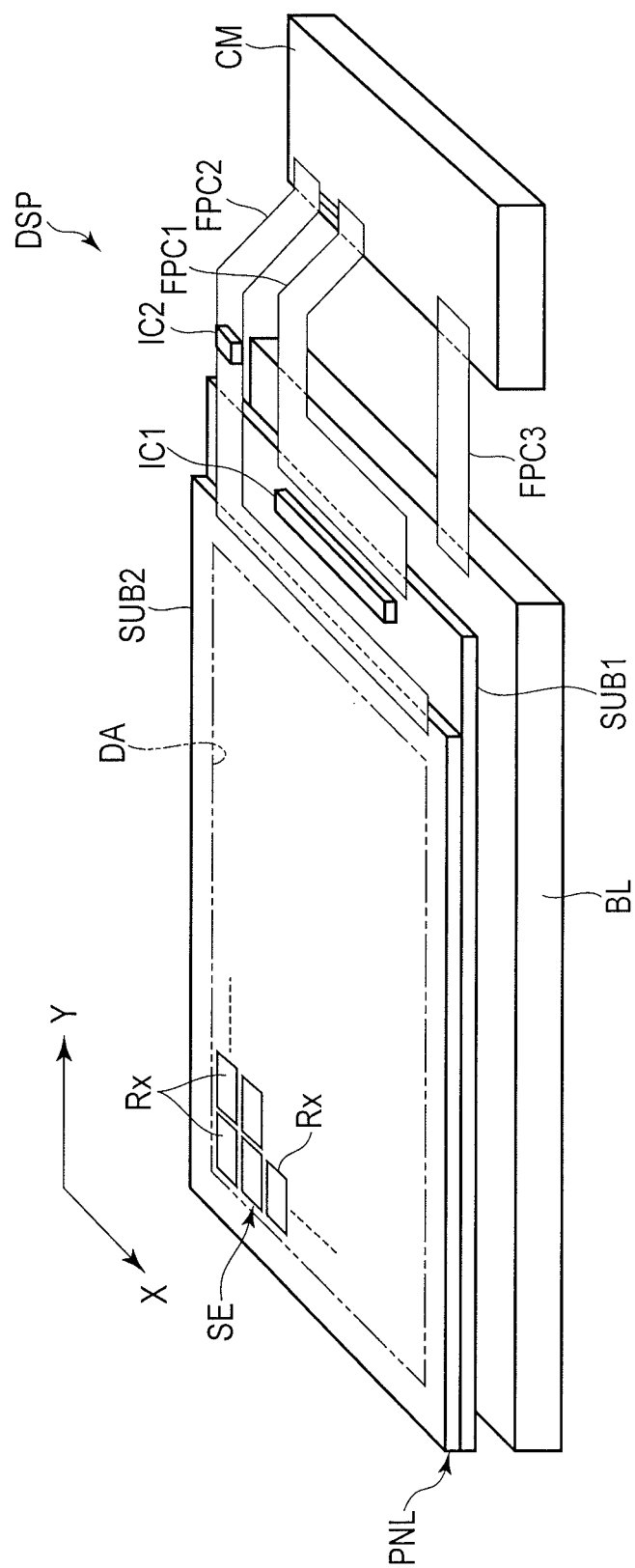
F I G. 1

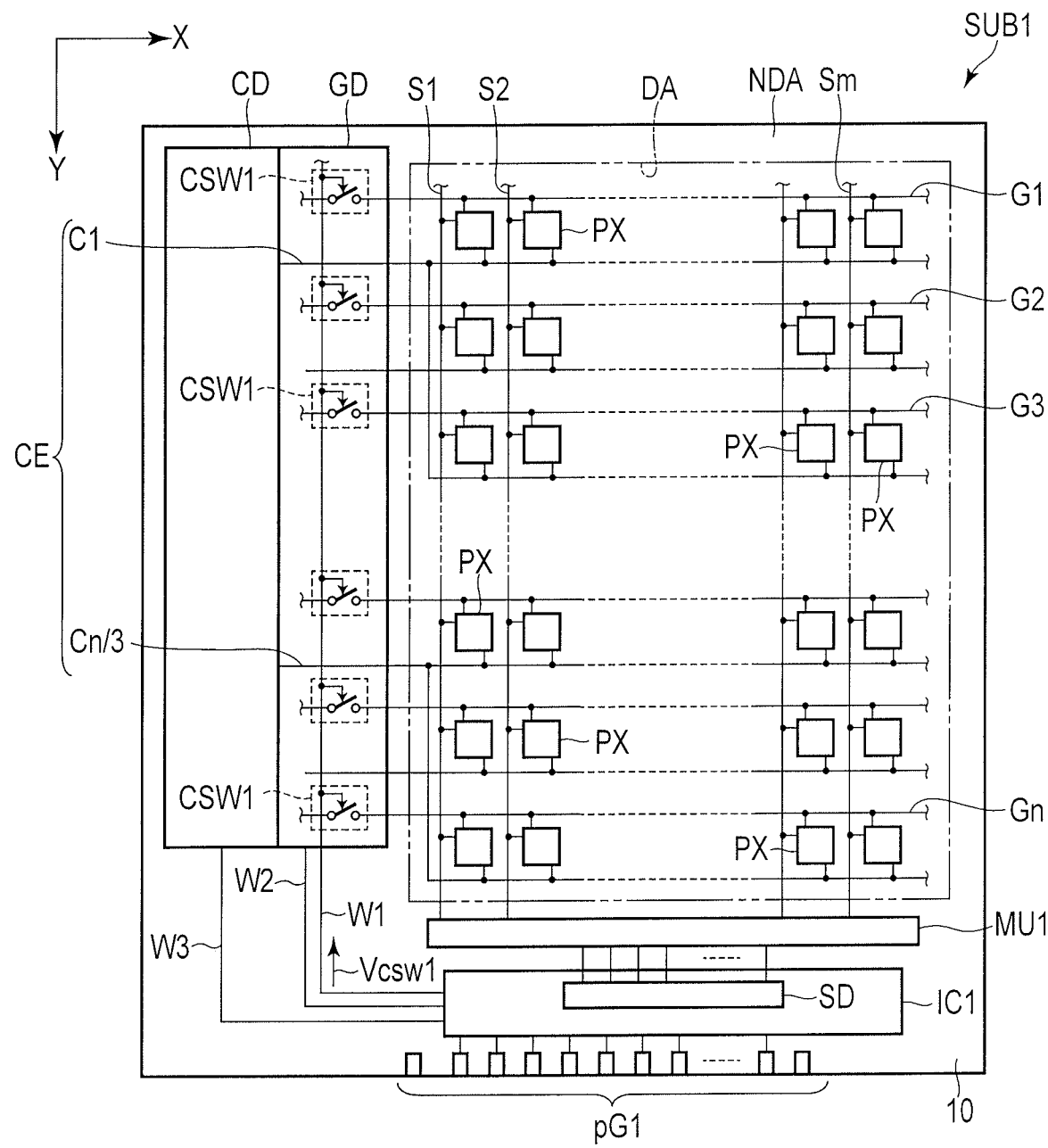
F I G. 2

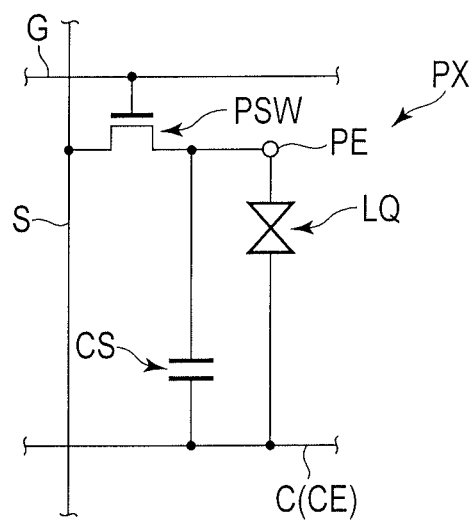
F I G. 3
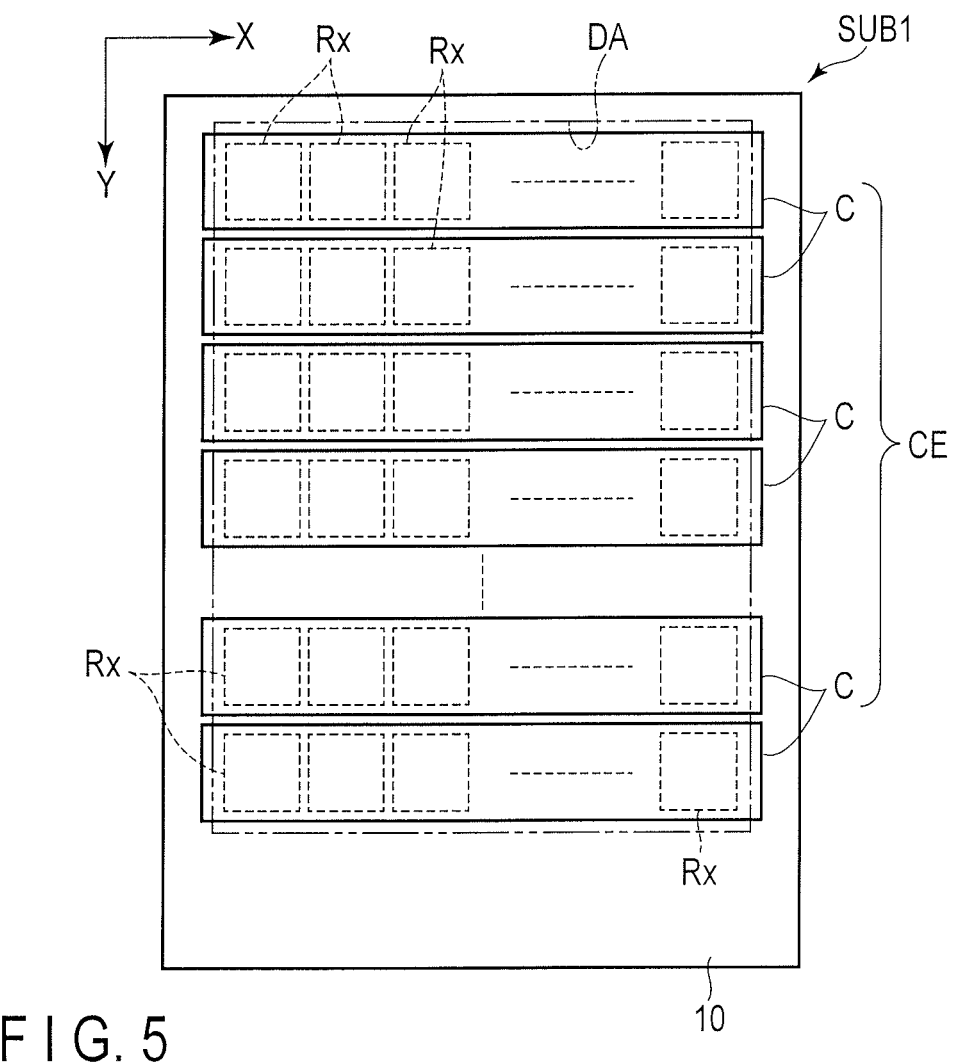
F I G. 5

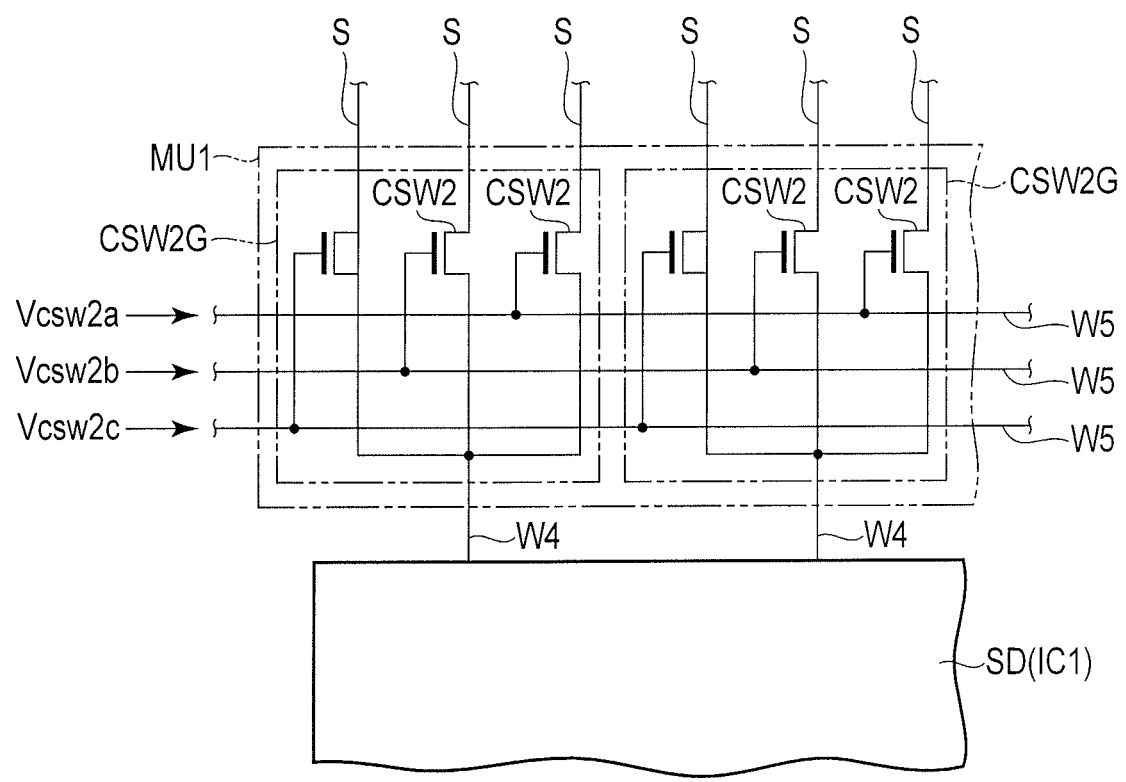
F I G. 6

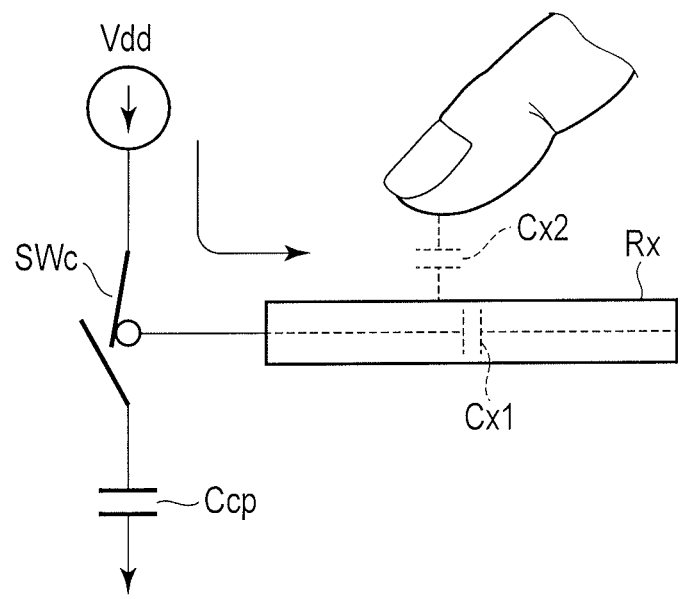
F I G. 9A
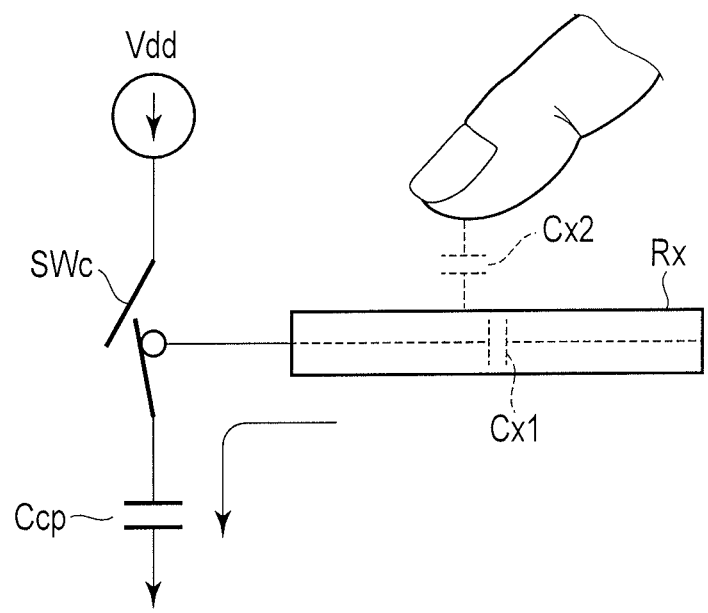
F I G. 9B

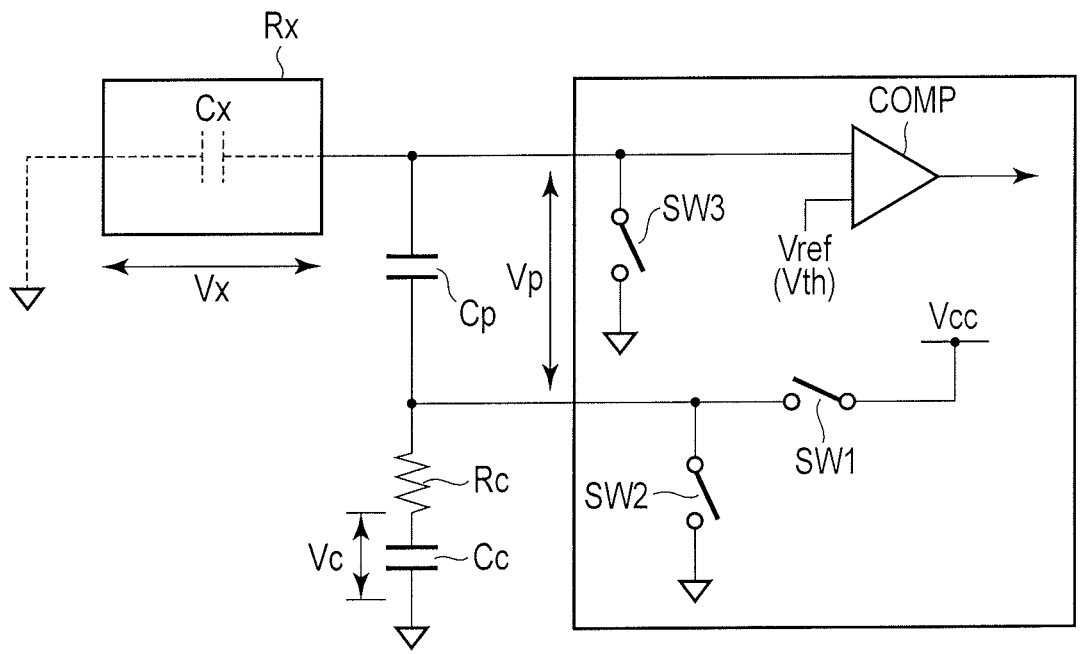
F I G. 10A
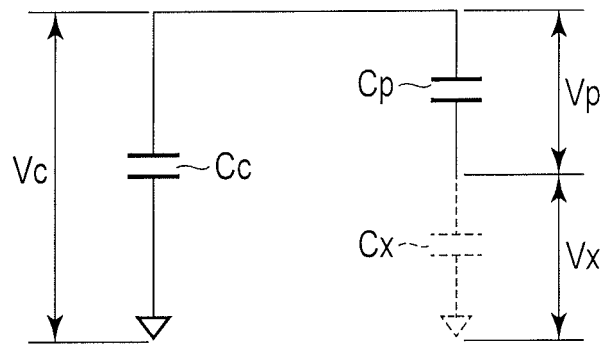
F I G. 10B

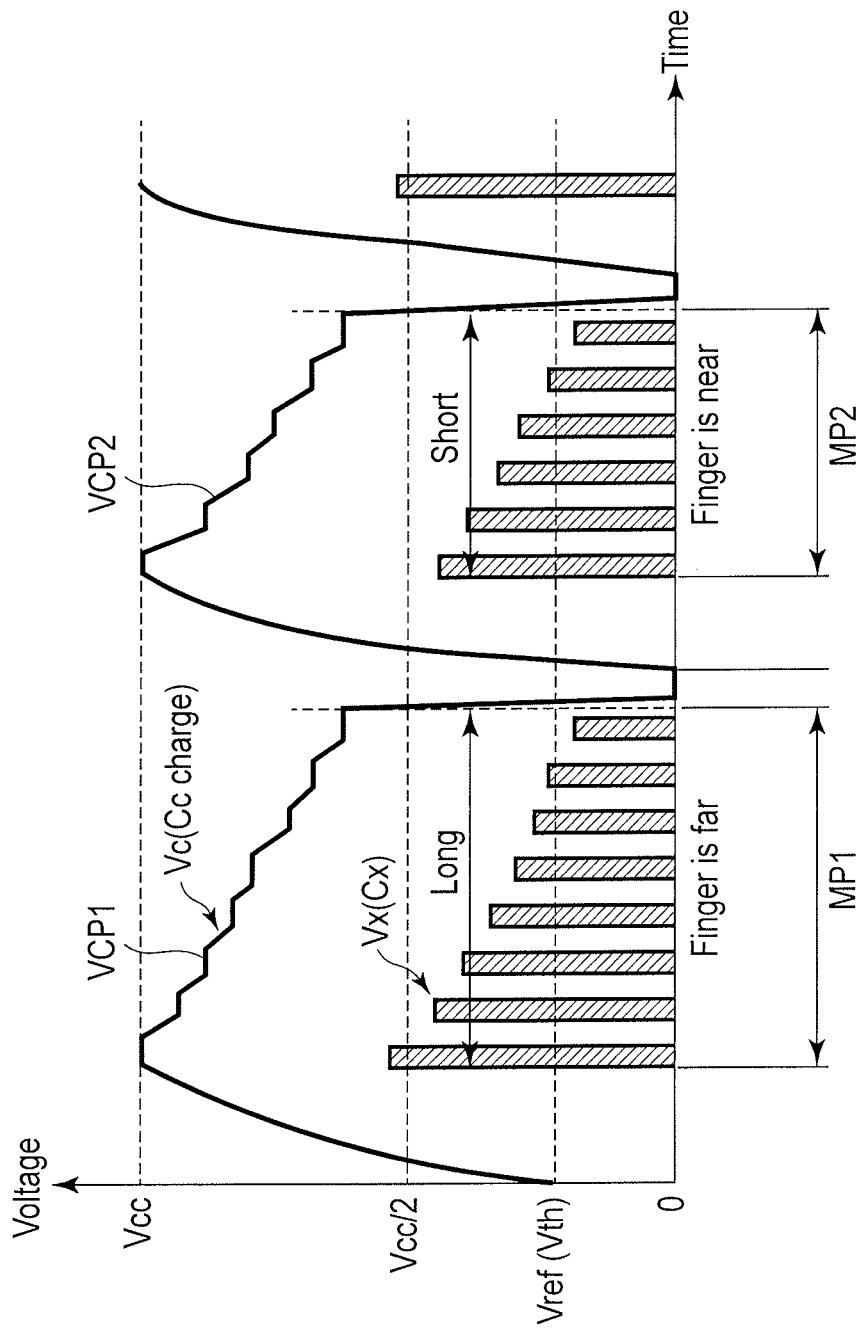
F I G. 11

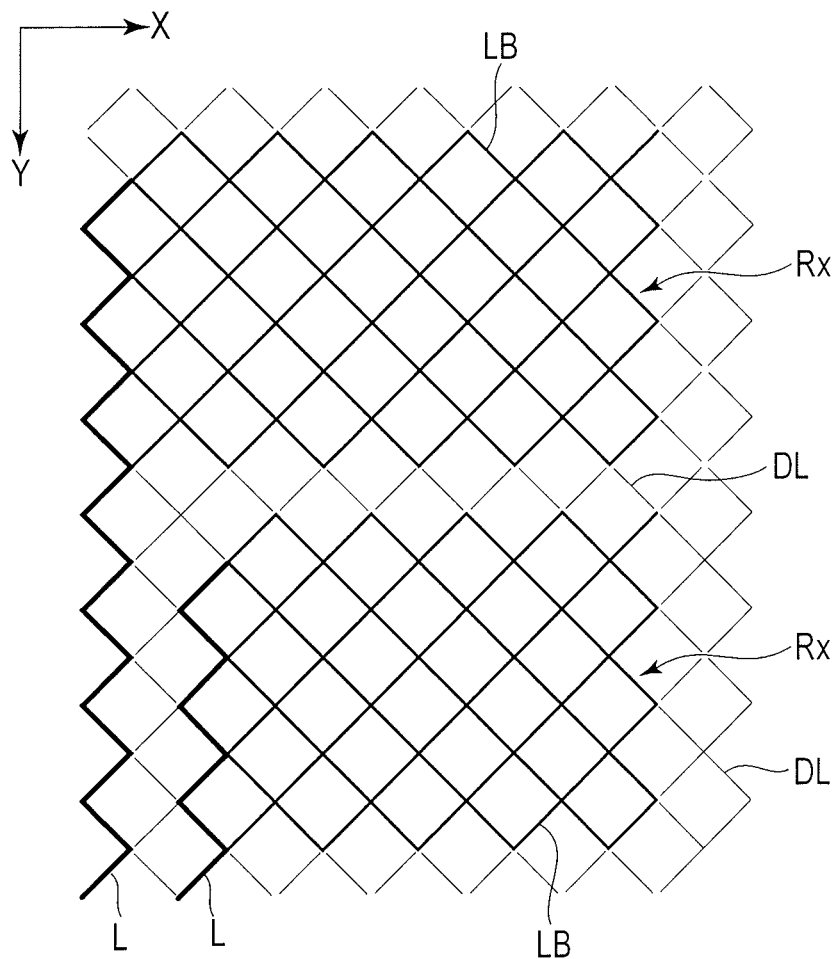
F I G. 17B

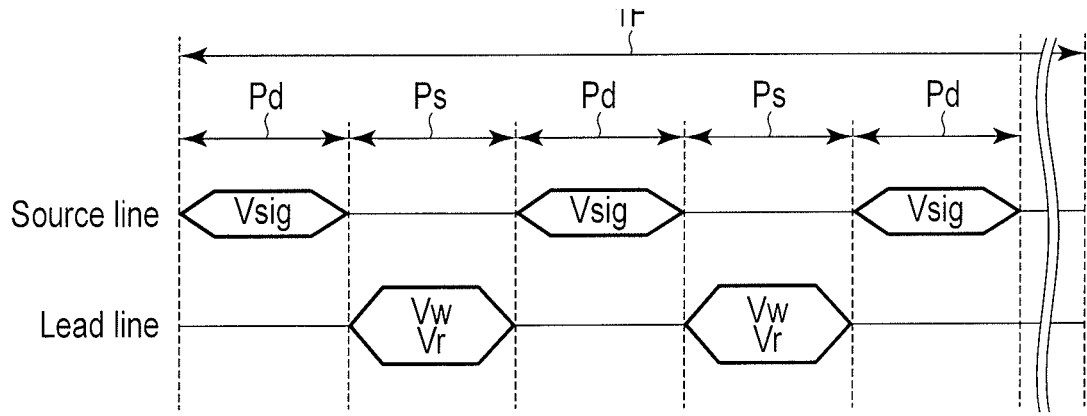
F I G. 21
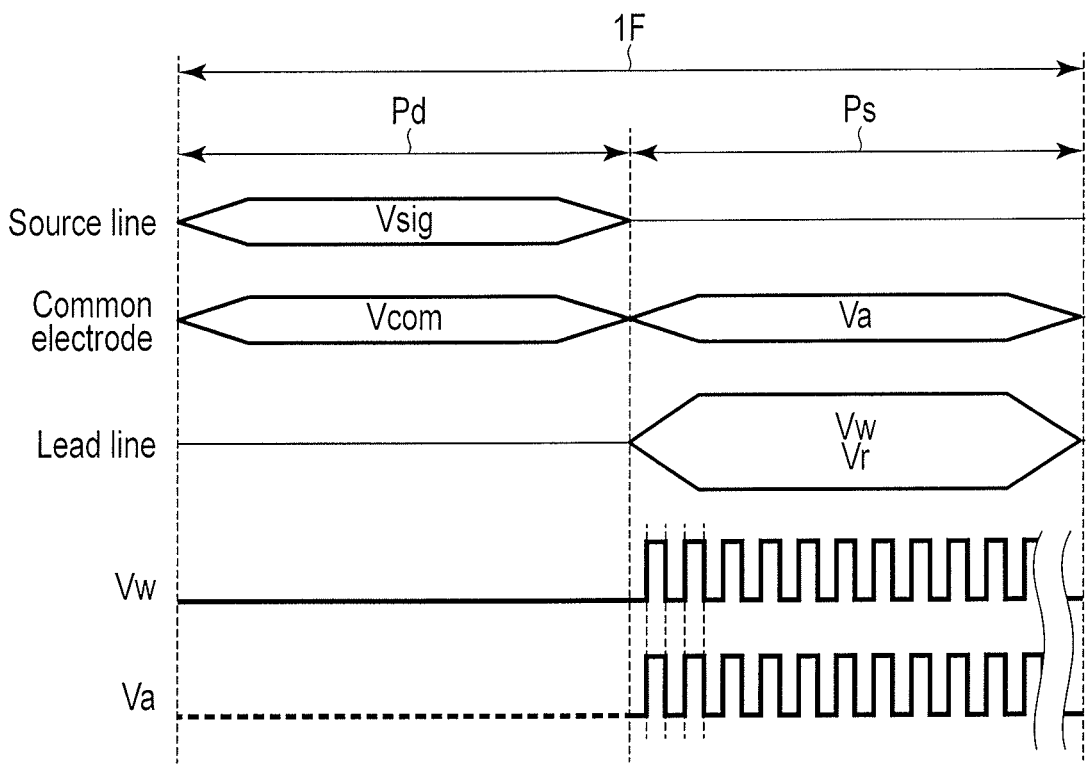
F I G. 22

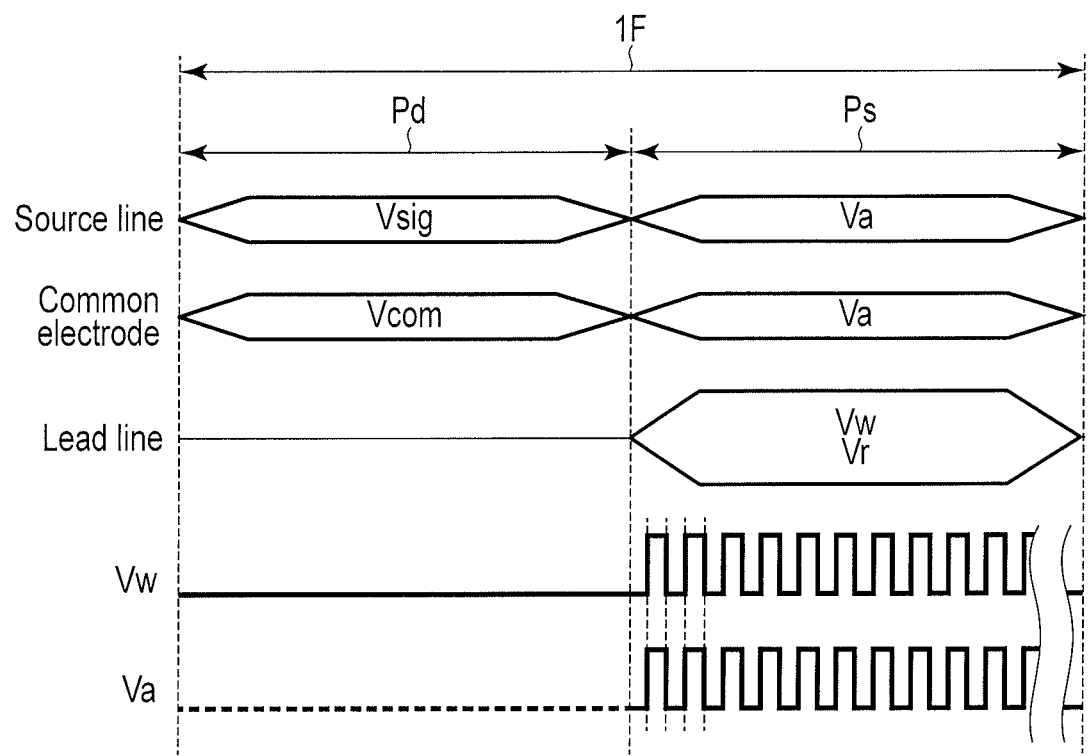
F I G. 28

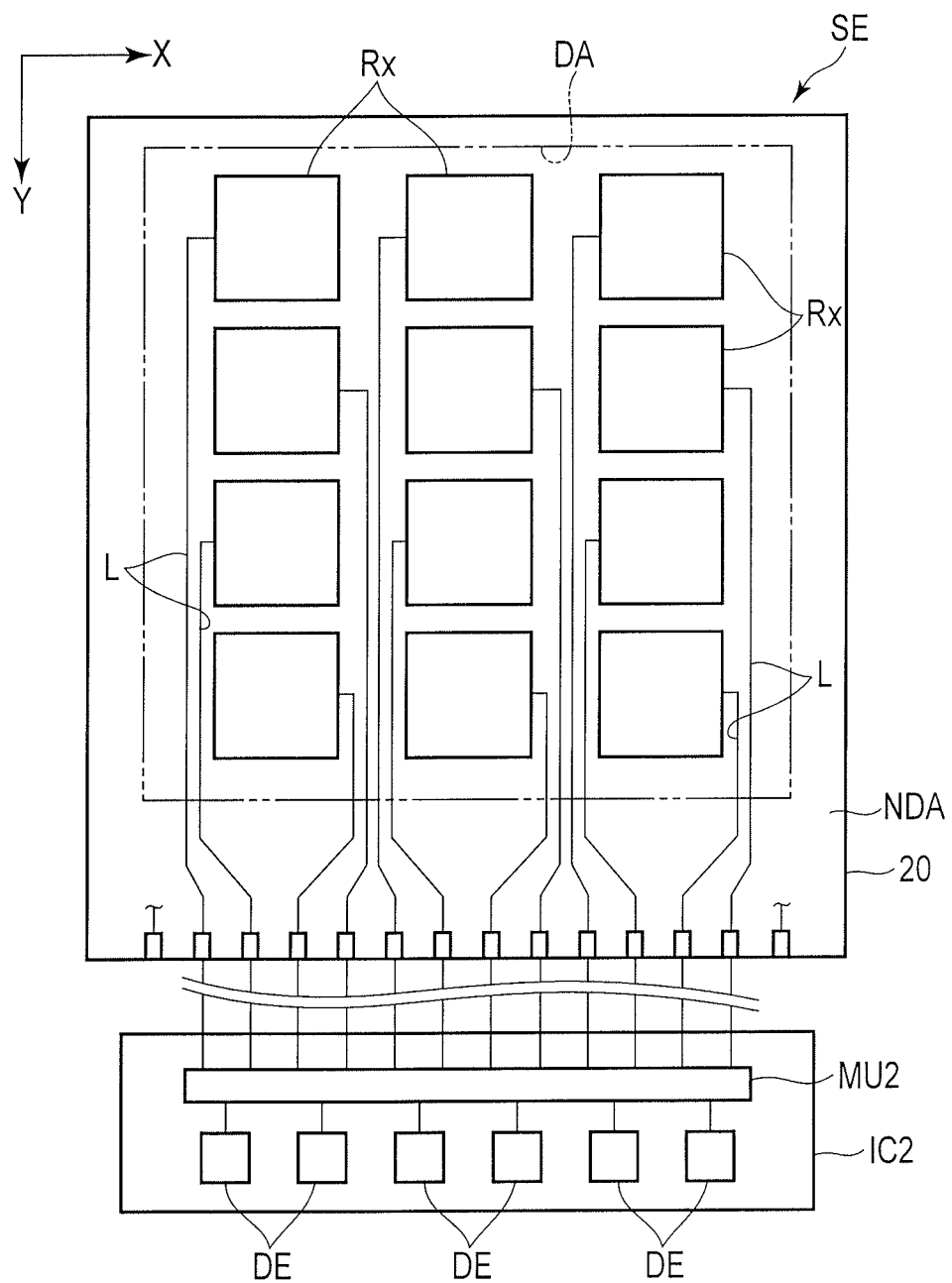
F I G. 29

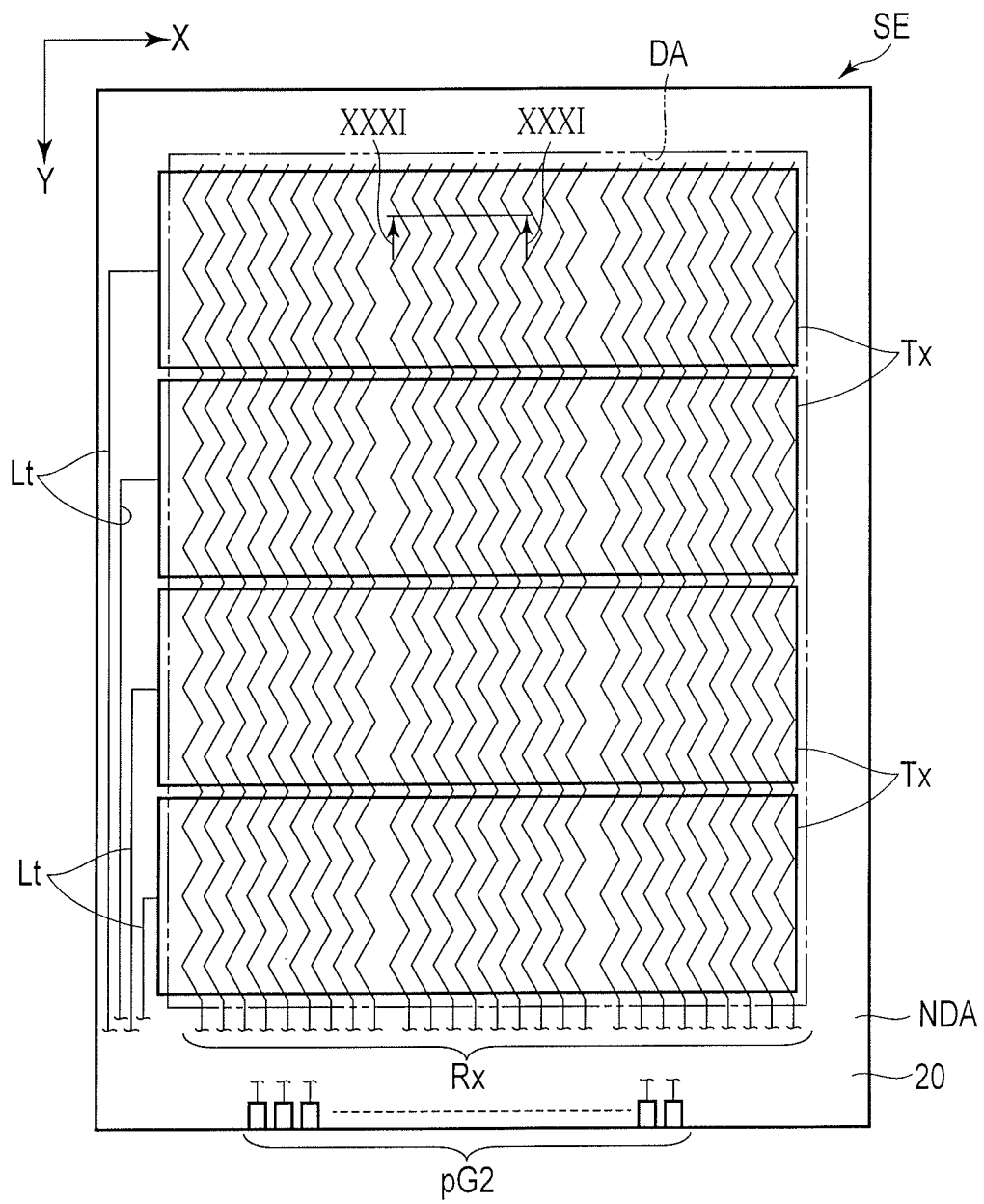
F I G. 30
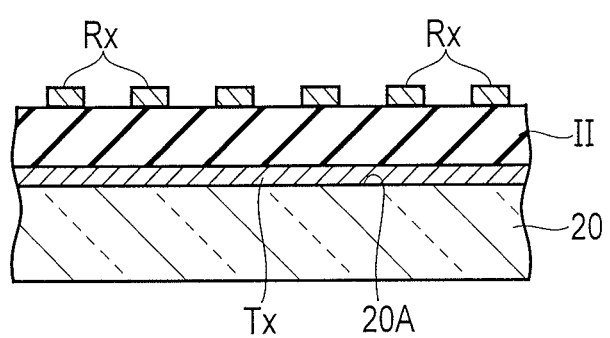
F I G. 31

ELECTROSTATIC CAPACITANCE-TYPE SENSOR-EQUIPPED DISPLAY DEVICE AND METHOD OF DRIVING THE SAME

CROSS-REFERENCE TO RELATED APPLICATIONS

This application is a continuation application of application Ser. No. 14/609,990, filed Jan. 30, 2015, which in turn claims the benefit of priority from Japanese Patent Application No. 2014-017112, filed Jan. 31, 2014, the entire contents of which are incorporated herein by reference.

FIELD

Embodiments described herein relate generally to an electrostatic capacitance-type sensor-equipped display device and a method of driving the same.

BACKGROUND

In general, a display device, which is applicable to a PDA (personal digital assistant) and a tablet PC (personal computer), includes, for example, an electrostatic capacitance-type sensor, and is configured to detect data which is directly input from a display screen with use of input means. As the input means, a conductor such as a pen or a human body can be used. Examples of this display device include an in-cell type display device configured such that an electrode, which forms the above-described sensor, is provided within a display panel, and an on-cell type display device configured such that an electrode, which forms the sensor, is provided on a display surface of the display panel.

The electrode, which forms the sensor, is located within a display area which displays an image, and detects a variation in electrostatic capacitance. Thus, the display device can detect position information of an input location by the input means, by extracting a variation in electrostatic capacitance (strength/weakness of electrostatic capacitive coupling) which occurs in the above-described electrode by the approach of the input means to the electrode.

BRIEF DESCRIPTION OF THE DRAWINGS

FIG. 1 is a perspective view which schematically illustrates the structure of an electrostatic capacitance-type sensor-equipped liquid crystal display device according to a first embodiment.

FIG. 2 is a plan view illustrating a schematic structure of a first substrate shown in FIG. 1.

FIG. 3 is an equivalent circuit diagram illustrating a pixel shown in FIG. 2.

FIG. 5 is a plan view which schematically illustrates a state in which a common electrode provided on the first substrate is formed such that the common electrode is divided into a plurality of electrodes.

FIG. 6 is an enlarged plan view illustrating a part of an outside of a display area of the first substrate, FIG. 6 being a circuit diagram illustrating a multiplexer.

FIG. 9A is a view for explaining the self-capacitive sensing method which is applicable to the liquid crystal display device according to the first embodiment, FIG. 9A being a view illustrating a state in which the detection electrode is being charged in a case where electrostatic capacitive coupling occurs between the detection electrode and the finger.

FIG. 9B is a view for explaining the self-capacitive sensing method in subsequence to FIG. 9A, FIG. 9B being a view illustrating a state in which the detection electrode is being discharged.

FIG. 10A is a circuit diagram illustrating an example of a basic structure which realizes the self-capacitive sensing method.

FIG. 10B is an equivalent circuit diagram illustrating capacitances shown in FIG. 10A, FIG. 10B being a view illustrating a state in which the charge of a capacitance Cc shifts to capacitances Cp and Cx.

FIG. 11 is a view illustrating a variation of the value of a voltage Vx of the capacitance Cx, shown in FIG. 10A and FIG. 10B, by a bar graph, and a variation of the value of a voltage Vc of the capacitance Cc by a line graph.

FIG. 17B is a plan view which schematically illustrates Modification 3 of the electrostatic capacitance-type sensor according to the second embodiment, FIG. 17B being a view illustrating a layout of detection electrodes, lead lines and dummy lines.

FIG. 21 is a timing chart for explaining a method of driving an electrostatic capacitance-type sensor-equipped liquid crystal display device according to a fourth embodiment, FIG. 21 being a view illustrating a video signal, a write signal and a read signal.

FIG. 22 is a timing chart for explaining a modification of the method according to the fourth embodiment, FIG. 22 being a view illustrating a video signal, a common voltage, a potential adjustment signal, a write signal and a read signal.

FIG. 27 is a view for explaining a method of driving an electrostatic capacitance-type sensor-equipped liquid crystal display device according to a seventh embodiment, FIG. 27 being a view illustrating a state in which control switching elements connected to source lines are all turned on.

FIG. 28 is a timing chart for explaining the method according to the seventh embodiment, FIG. 28 being a view illustrating a video signal, a common voltage, a potential adjustment signal, a write signal and a read signal.

FIG. 29 is a circuit diagram illustrating a part of an electrostatic capacitance-type sensor-equipped liquid crystal display device according to an eighth embodiment, FIG. 29 being a view illustrating an electrostatic capacitance-type sensor, a multiplexer, and a plurality of detectors.

FIG. 30 is a plan view which schematically illustrates a structure of an electrostatic capacitance-type sensor of a liquid crystal display device according to a ninth embodiment.

FIG. 31 is a cross-sectional view which schematically illustrates a structure at a time when the electrostatic capacitance-type sensor illustrated in FIG. 30 is cut along line XXXI-XXXI.

DETAILED DESCRIPTION

Figure 4:
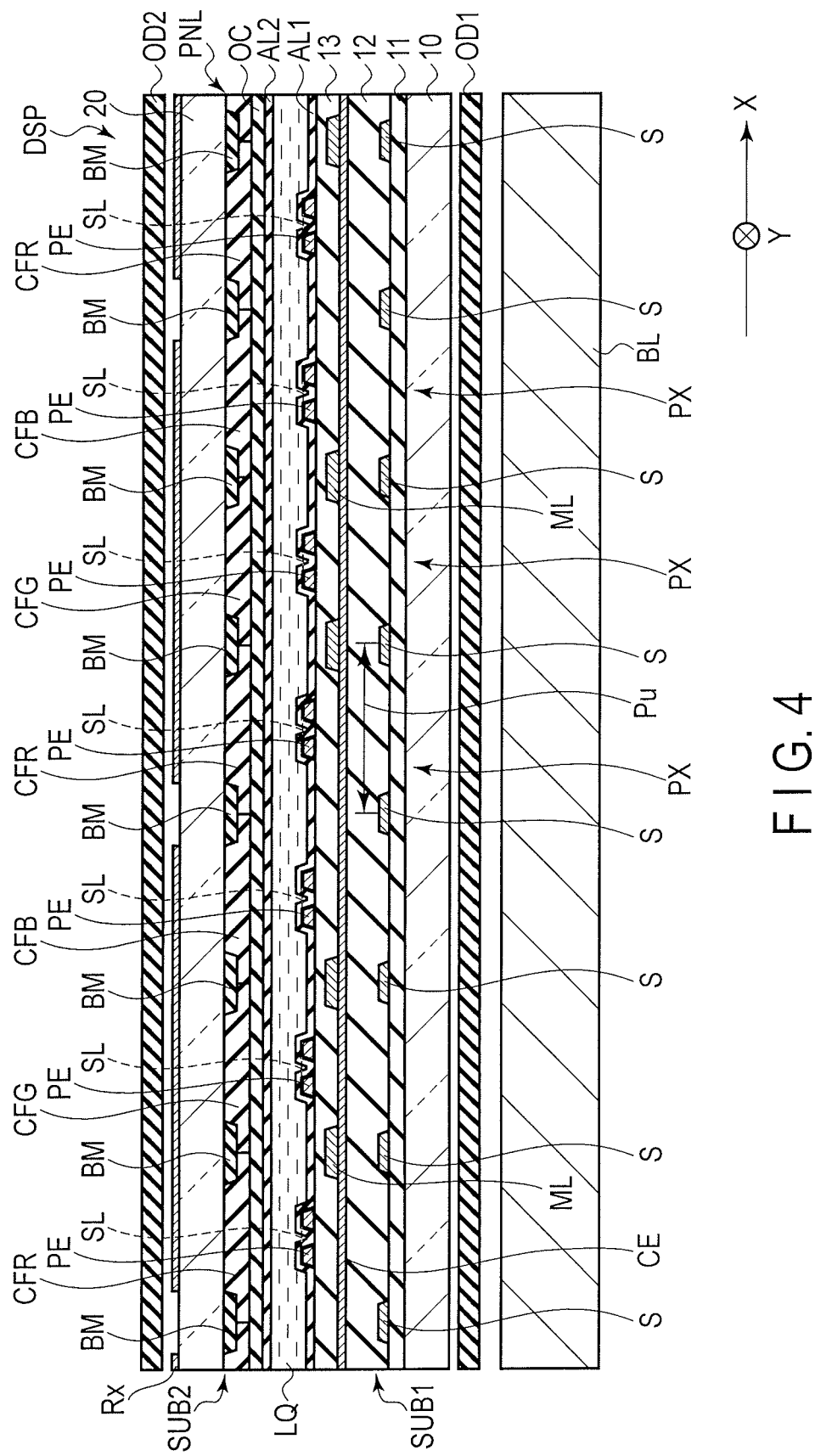
FIG. 4 is a cross-sectional view which schematically illustrates the structure of a part of the liquid crystal display device.

In general, according to one embodiment, there is provided an electrostatic capacitance-type sensor-equipped display device comprising: a display panel with a display surface which displays an image. The electrostatic capacitance-type sensor includes a plurality of detection electrodes disposed in a matrix, the detection electrodes being mutually electrically independently provided above the display surface and being configured to detect a variation in electrostatic capacitance; and a plurality of lead lines provided above the display surface, connected to the detection electrodes in a one-to-one correspondence, and formed of a metal.

According to another embodiment, there is provided a method of driving an electrostatic capacitance-type sensor-equipped display device comprising a display panel, the display panel including a first substrate, a second substrate which includes a display surface for displaying an image and is disposed opposite to the first substrate with a gap, a plurality of pixels, and a common electrode provided on the first substrate or the second substrate and shared by the pixels. Each of the pixels includes a pixel switching element formed on the first substrate and connected to a gate line and a source line, and a pixel electrode formed on the first substrate and connected to the pixel switching element. The electrostatic capacitance-type sensor includes a plurality of detection electrodes disposed in a matrix, mutually electrically independently provided above the display surface and configured to detect a variation in electrostatic capacitance, and a plurality of lead lines provided above the display surface, connected to the detection electrodes in a one-to-one correspondence, and formed of a metal. The method comprises: delivering a control signal to the gate line and a video signal to the source line, in a display operation period, thereby driving the display panel, stopping an input of the control signal and the video signal to the display panel, and driving the electrostatic capacitance-type sensor, in an input information detection period that does not overlap the display operation period; and writing a potential adjustment signal, which has the same waveform as a write signal which is written in the electrostatic capacitance-type sensor, in the common electrode in synchronism with the write signal, in the input position information detection period.

Embodiments of the present invention will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

To begin with, the basic concept of embodiments of the invention is described.

An electrostatic capacitance-type sensor-equipped display device is configured to detect data which is input from a display surface side with use of input means. As the input means, a conductor such as a pen or a human body can be used. The display device can perform single-touch detection. For example, the display device can detect that the display surface has been touched by one finger. In addition, the display device can detect position information of a location touched by the finger.

In the meantime, in recent years, the needs for display devices have been diversified, and there is a need for display devices which can perform multi-touch detection or close-proximity detection (hovering detection). A display device, which performs multi-touch detection, can detect, for example, that the display surface has been touched by a plurality of fingers. A display device, which performs close-proximity detection, can detect, for example, that the hand is kept in a state of close proximity to the display surface in a region opposed to the display surface. Incidentally, in the close-proximity detection, the behavior of the hand can be detected, without the display surface being touched by the hand.

As described above, in order to enable multi-touch detection or close-proximity detection, the display device needs to include an electrostatic capacitance-type sensor with high sensitivity. This being the case, a technique for enhancing the sensitivity of the electrostatic capacitance-type sensor has been developed. As this technique, for example, a technique has been developed, wherein detection electrodes of the electrostatic capacitance-type sensor are arranged in a matrix and a variation in electrostatic capacitance occurring in each detection electrode is independently detected. A plurality of detection electrodes, and lead lines, which are connected to the plural detection electrodes in a one-to-one correspondence, can be formed by making use of ITO (indium tin oxide).

However, when the display device has been fabricated as described above, there occurs such a problem that it is difficult to obtain a display device with excellent detection precision of input position information. A reason for this is that the lead lines, which are connected to the detection electrodes in a one-to-one correspondence, need to be wired with an insulation distance from other detection electrodes. Another reason for this is that if the lead lines are wired as described above, non-uniformity occurs in size of detection electrodes, which leads to non-uniformity in detection precision of input position information within the display surface. Still another reason is that when the lead lines are wired by making use of ITO as described above, each lead line needs to have a width of a specific value or more, and a parasitic capacitance is undesirably formed between the lead line and the input means.

Besides, a detection signal of a finger, which is not in touch with, but in close proximity to, the display surface of the display device, is very weak. Specifically, an electrostatic capacitance formed between the finger, which is in close proximity to the display surface, and the detection electrode is very small. On the other hand, noise is added from the display panel to the electrostatic capacitance-type sensor, or a parasitic capacitance occurs between the electrostatic capacitance-type sensor and various electrodes of the display panel. Thereby, the detection sensitivity of the electrostatic capacitance-type sensor considerably deteriorates. Thus, in order to enhance the detection sensitivity of the electrostatic capacitance-type sensor, it is desirable to provide a guard electrode between the electrostatic capacitance-type sensor and the display panel. However, when the guard electrode is provided in the display device, it becomes very difficult to reduce the thickness of the display device and to reduce the manufacturing cost.

As is understood from the above, it is difficult to obtain a display device with excellent detection precision of input position information, if the detection electrodes and lead lines are formed by only making use of ITO.

Thus, in the embodiments of the invention, by clarifying the causes of the above problems and solving the problems, an electrostatic capacitance-type sensor-equipped display device with excellent detection precision of input position information and a method of driving the electrostatic capacitance-type sensor-equipped display device can be obtained. Next, means and methods for solving the above problems will be described.

First Embodiment

Referring to the accompanying drawings, a detailed description is given of an electrostatic capacitance-type sensor-equipped display device according to a first embodiment, and a method of driving the display device. In this embodiment, the display device is a liquid crystal display device. FIG. 1 is a perspective view which schematically illustrates the structure of the electrostatic capacitance-type sensor-equipped liquid crystal display device according to the first embodiment.

As illustrated in FIG. 1, a liquid crystal display device DSP includes an active-matrix-type liquid crystal display panel PNL, a driving IC chip IC1 which drives the liquid crystal display panel PNL, a sensor SE of an electrostatic capacitance type, a driving IC chip 102 which drives the sensor SE, a backlight unit BL which illuminates the liquid crystal display panel PNL, a control module CM, and flexible wiring boards FPC1, FPC2, FPC3.

In the illustrated example, since detection electrodes Rx, which form the sensor SE, are provided on the display surface of the liquid crystal display panel PNL, the liquid crystal display device DSP is an on-cell type liquid crystal display device. Incidentally, as will be described in connection with other embodiments to be described later, the electrodes, which form the sensor SE, can be provided in the inside of the liquid crystal display panel PNL, and the liquid crystal display device DSP in this case is an in-cell type liquid crystal display device.

In addition, the driving IC chip IC1 is mounted on the liquid crystal display panel PNL. The flexible wiring board FPC1 connects the liquid crystal display panel PNL and the control module CM. The flexible wiring board FPC2 connects the sensor SE and the control module CM. The driving IC chip 102 is mounted on the flexible wiring board FPC2. The flexible wiring board FPC3 connects the backlight unit BL and the control module CM. In this case, the control module CM can be restated as an application processor.

The liquid crystal display panel PNL includes a first substrate SUB1, a second substrate SUB2 which is disposed to be opposed to the first substrate SUB1, and a liquid crystal layer (a liquid crystal layer LQ to be described later) which is held between the first substrate SUB1 and second substrate SUB2. Incidentally, in this embodiment, the first substrate SUB1 can be restated as an array substrate, and the second substrate SUB2 can be restated as a counter-substrate.

The liquid crystal display panel PNL includes a display area (active area) DA which displays an image. In this example, a plurality of detection electrodes Rx are arranged in mutually crossing first direction X and second direction Y within the display area DA. In this embodiment, the first direction X and second direction Y are perpendicular to each other, the first direction X is a row direction, and the second direction Y is a column direction. Thus, the plural detection electrodes Rx are provided in a matrix.

The backlight unit BL is disposed on a back surface side of the first substrate SUB1. As this backlight unit BL, various modes are applicable, and use may be made of either a backlight unit which utilizes a light-emitting diode (LED) as a light source, or a backlight unit which utilizes a cold cathode fluorescent lamp (CCFL) as a light source. A description of the detailed structure of the backlight unit BL is omitted.

FIG. 2 is a view which schematically illustrates the structure and an equivalent circuit of the first substrate SUB1 shown in FIG. 1. As illustrated in FIG. 2, in a non-display area NDA on the outside of the display area DA, the driving IC chip IC1 is mounted on the first substrate SUB1. A source line driving circuit SD, etc. are included in the driving IC chip IC1.

Besides, in the non-display area NDA of the first substrate SUB1, a multiplexer MU1, a gate line driving circuit GD, a common electrode driving circuit CD and a pad group (hereinafter referred to as an OLB pad group) pG1 of outer lead bonding are formed. The driving IC chip IC1 is connected to the multiplexer MU1, gate line driving circuit GD, common electrode driving circuit CD and OLB pad group pG1. The gate line driving circuit GD includes an n-number of control switching elements CSW1, and is connected to the common electrode driving circuit CD.

In the display area DA, a plurality of pixels PX are located between the first substrate SUB1 and second substrate SUB2. The number of plural pixels PX is m×n (m and n are positive integer numbers), and the pixels PX are provided in a matrix in the first direction X and second direction Y.

In the display area DA, an n-number of gate lines G (G1 to Gn), an m-number of source lines S (S1 to Sm) and a common electrode CE are formed above the first substrate SUB1. The gate lines G extend substantially linearly in the first direction X, are led out to the outside of the display area DA, and are connected to the gate line driving circuit GD. The gate lines G are arranged at intervals in the second direction Y. The gate lines G are connected to the control switching elements CSW1 in a one-to-one correspondence. The source lines S extend substantially linearly in the second direction Y, and cross the gate lines G. The source lines S are arranged at intervals in the first direction X. The source lines S are led out to the outside of the display area DA, and are connected to the multiplexer MU1.

The common electrode CE includes a plurality of divisional electrodes C which extend substantially linearly in the first direction X and are arranged at intervals in the second direction Y. For example, the liquid crystal display device DSP utilizes a multiplexer MU2 illustrated in another embodiment (FIG. 29) to be described later, it is preferable that the common electrode CE is dividedly formed in accordance with the detection method of the multiplexer MU2. Incidentally, as illustrated in another embodiment (FIG. 13) to be described later, the common electrode CE may not be dividedly formed. For example, in the case where all detection electrodes Rx are scanned at once and a variation in electrostatic capacitance is detected, it is preferable that the common electrode CE is not divided. For example, the common electrode CE includes an n/3 number of divisional electrodes C (C1 to Cn/3). A plurality of pixels PX share one divisional electrode C. Incidentally, the number of divisional electrodes C and the size thereof are not specifically limited, and may be variously altered. For example, the divisional electrode C may be shared by pixels PX of four rows. The divisional electrodes C are led out to the outside of the display area DA and are connected to the common electrode driving circuit CD. In the meantime, the gate lines G, source lines S and divisional electrodes C may not necessarily extend linearly, and portions thereof may be bent.

The driving IC chip IC1 is connected to the multiplexer DU1, gate line driving circuit GD, common electrode driving circuit CD and OLB pad group pG1. Although not illustrated as a whole, the driving IC chip IC1 and gate line driving circuit GD are connected by control lines W1, W2, and the driving IC chip IC1 and common electrode driving circuit CD are connected by a control line W3. Thus, the driving IC chip IC1 can deliver a control signal Vcsw1 to the control switching elements CSW1 via the control line W1. For example, under the control of the control module CM, the driving IC chip IC1 can output the control signal Vcsw1 which sets the control switching elements CSW1 in an OFF state (non-conductive state), and can switch all gate lines G to an electrically floating state.

FIG. 3 is an equivalent circuit diagram illustrating the pixel PX shown in FIG. 2. As illustrated in FIG. 3, each pixel PX includes a pixel switching element PSW, a pixel electrode PE, and a common electrode CE (divisional electrode C). The pixel switching element PSW is formed of, for example, a TFT (thin-film transistor). The pixel switching element PSW is electrically connected to the gate line G and source line S. The pixel switching element PSW may be either a top-gate type TFT or a bottom-gate type TFT. In addition, although a semiconductor layer of the pixel switching element PSW is formed of, for example, polysilicon, the semiconductor layer may be formed of amorphous silicon.

The pixel electrode PE is electrically connected to the pixel switching element PSW. The pixel electrode PE is opposed to the divisional electrode C via an insulation film. The divisional electrode C, insulation film and pixel electrode PE form a storage capacitance CS.

FIG. 4 is a cross-sectional view which schematically illustrates the structure of a part of the liquid crystal display device DSP.

Specifically, the liquid crystal display device DSP includes not only the above-described liquid crystal display panel PNL, backlight unit BL, etc., but also a first optical element OD1, a second optical element OD2, etc. In addition, although the illustrated liquid crystal display panel PNL has a structure that is adaptive to an FFS (Fringe Field Switching) mode as a display mode, it may have a structure adaptive to some other display mode.

Incidentally, the liquid crystal display panel PNL, which utilizes the FFS mode, includes the pixel electrode PE and common electrode CE on the first substrate SUB1. Liquid crystal molecules, which constitute a liquid crystal layer LQ, are switched by mainly using a lateral electric field formed between the pixel electrode PE and common electrode CE (in particular, that electric field of a fringe electric field, which is substantially parallel to the major surface of the substrate).

The liquid crystal display panel PNL includes the first substrate SUB1, second substrate SUB2 and liquid crystal layer LQ. The first substrate SUB1 and second substrate SUB2 are attached in a state in which a predetermined cell gap is created therebetween. The liquid crystal layer LQ is held in the cell gap between the first substrate SUB1 and second substrate SUB2.

The first substrate SUB1 is formed by using a first insulative substrate 10 with light transmissivity, such as a glass substrate or a resin substrate. The first substrate SUB1 includes source lines S, a common electrode CE, pixel electrodes PE, a first insulation film 11, a second insulation film 12, a third insulation film 13, and a first alignment film AL1, on that side of the first insulative substrate 10, which is opposed to the second substrate SUB2.

The first insulation film 11 is disposed on the first insulative substrate 10. Incidentally, although not described in detail, gate lines, gate electrodes and semiconductor layers of pixel switching elements, etc. are disposed between the first insulative substrate 10 and first insulation film 11. The source lines S are formed on the first insulation film 11. In addition, the source electrodes and drain electrodes of the pixel switching elements are formed on the first insulation film 11. In the example illustrated, the source lines S extend in the second direction Y.

The second insulation film 12 is disposed on the source lines S and first insulation film 11. The common electrode CE is formed on the second insulation film 12. In the meantime, in the present embodiment, the common electrode CE is composed of a plurality of segments (a plurality of divisional electrodes C), as described above. However, as illustrated in another embodiment (FIG. 13) to be described later, there may be a case in which the common electrode CE is formed without being divided into a plurality of segments. The common electrode CE is formed of a transparent, electrically conductive material such as indium tin oxide (ITO) or indium zinc oxide (IZO). Incidentally, in the example illustrated, although metal layers ML are formed on the common electrode CE and the resistance of the common electrode CE is decreased, the metal layers ML may be omitted.

The third insulation film 13 is disposed on the common electrode CE and second insulation film 12. The pixel electrodes PE are formed on the third insulation film 13. Each pixel electrode PE is located between neighboring source lines S, and is opposed to the common electrode CE. In addition, each pixel electrode PE includes a slit SL at a position opposed the common electrode CE. Such pixel electrodes PE are formed of, for example, a transparent, electrically conductive material such as ITO or IZO. The first alignment film AL1 covers the pixel electrodes PE and third insulation film 13.

On the other hand, the second substrate SUB2 is formed by using a second insulative substrate 20 with light transmissivity, such as a glass substrate or a resin substrate. The second substrate SUB2 includes a black matrix BM, color filters CFR, CFG, CFB, an overcoat layer OC, and a second alignment film AL2, on that side of the second insulative substrate 20, which is opposed to the first substrate SUB1.

The black matrix BM is formed on an inner surface of the second insulative substrate 20 and partitions the respective pixels. The color filters CFR, CFG, CFB are formed on an inner surface of the second insulative substrate 20, and parts thereof overlap the black matrix BM. The color filter CFR is a red color filter, the color filter CFG is a green color filter, and the color filter CFB is a blue color filter. The overcoat layer OC covers the color filters CFR, CFG, CFB. The overcoat layer OC is formed of a transparent resin material. The second alignment film AL2 covers the overcoat layer OC.

Detection electrodes Rx are formed above an outer surface of the second insulative substrate 20. Although the detection electrode Rx is formed in an island shape, the detection electrode Rx is depicted in a simplified manner in this example, and the depiction of lead lines L (to be described later) is omitted. The details of the structure of the detection electrodes Rx will be described later. Such detection electrodes Rx are formed of, for example, a transparent, electrically conductive material such as ITO or IZO.

The first optical element OD1 is disposed between the first insulative substrate 10 and backlight unit BL. The second optical element OD2 is disposed above the detection electrodes Rx. Each of the first optical element OD1 and second optical element OD2 includes at least a polarizer, and may also include a retardation plate, where necessary.

FIG. 5 is a plan view which schematically illustrates a state in which the common electrode CE provided on the first substrate SUB1 is formed such that the common electrode CE is divided into a plurality of electrodes. In this example, only the first insulative substrate 10 and common electrode CE are extracted from the first substrate SUB1 and described. In addition, in order to describe an example of the positional relationship between the common electrode CE and detection electrodes Rx, the detection electrodes Rx are depicted by broken lines.

As illustrated in FIG. 5, divisional electrode C is formed in band shape and extends substantially linearly in the first direction X. For example, the detection electrode Rx is formed to have a size corresponding to the size of the divisional electrode C. In this embodiment, a plurality of detection electrodes Rx of one row, which are arranged in the first direction X, are opposed to each divisional electrode C. As has already been described above, the common electrode CE may be formed without being divided into plural electrodes, as illustrated in another embodiment (FIG. 13) to be described later.

FIG. 6 is an enlarged plan view illustrating a part of the non-display area NDA of the first substrate SUB1, FIG. 6 being a circuit diagram illustrating a part of the multiplexer MU1. As illustrated in FIG. 6, the multiplexer MU1 includes a plurality of control switching element groups CSW2G. Each control switching element group CSW2G includes a plurality of control switching elements CSW2. In this embodiment, each control switching element group CSW2G includes three control switching elements CSW2. In this embodiment, the multiplexer MU1 is a ⅓ multiplexer.

The multiplexer MU1 is connected to a plurality of source lines S. In addition, the multiplexer MU1 is connected to the source line driving circuit SD via connection lines W4. In this example, the number of connection lines W4 is ⅓ of the number of source lines S.

The control switching elements CSW2 are ON/OFF switched by control signals Vcsw2a, Vcsw2b and Vcsw2c, such that three source lines S per output (connection line W4) of the source line driving circuit SD are driven in a time-division manner. These control signals Vcsw2a, Vcsw2b and Vcsw2c are delivered to the control switching elements CSW2 via a plurality of control lines W5 from the driving IC chip IC1.

By the turn-on of the control switching element CSW2, the transmission of the signal (e.g. video signal Vsig) from the source line driving circuit SD to the source line S is permitted. On the other hand, under the control of the control module CM, the driving IC chip IC1 can simultaneously output the control signals Vcsw2a, Vcsw2b, Vcsw2c which set the control switching elements CSW2 in the OFF state (non-conductive state), and can switch all source lines S to the electrically floating state.

In the meantime, the liquid crystal display panel PNL can utilize conventionally known various multiplexers (selector circuits), in place of the above-described multiplexer MU1. For example, the liquid crystal display panel PNL can utilize a ½ multiplexer.

In addition, the liquid crystal display panel PNL may be formed without the above-described multiplexer (e.g. multiplexer MU1). In this case, each source line S may be directly connected to the source line driving circuit SD, or may be connected to the source line driving circuit SD via some other control switching element. In the case where the source lines S are connected to the source line driving circuit SD via some other control switching elements, all source lines S can be switched to the electrically floating state by turning off all the other control switching elements.

Figure 7:
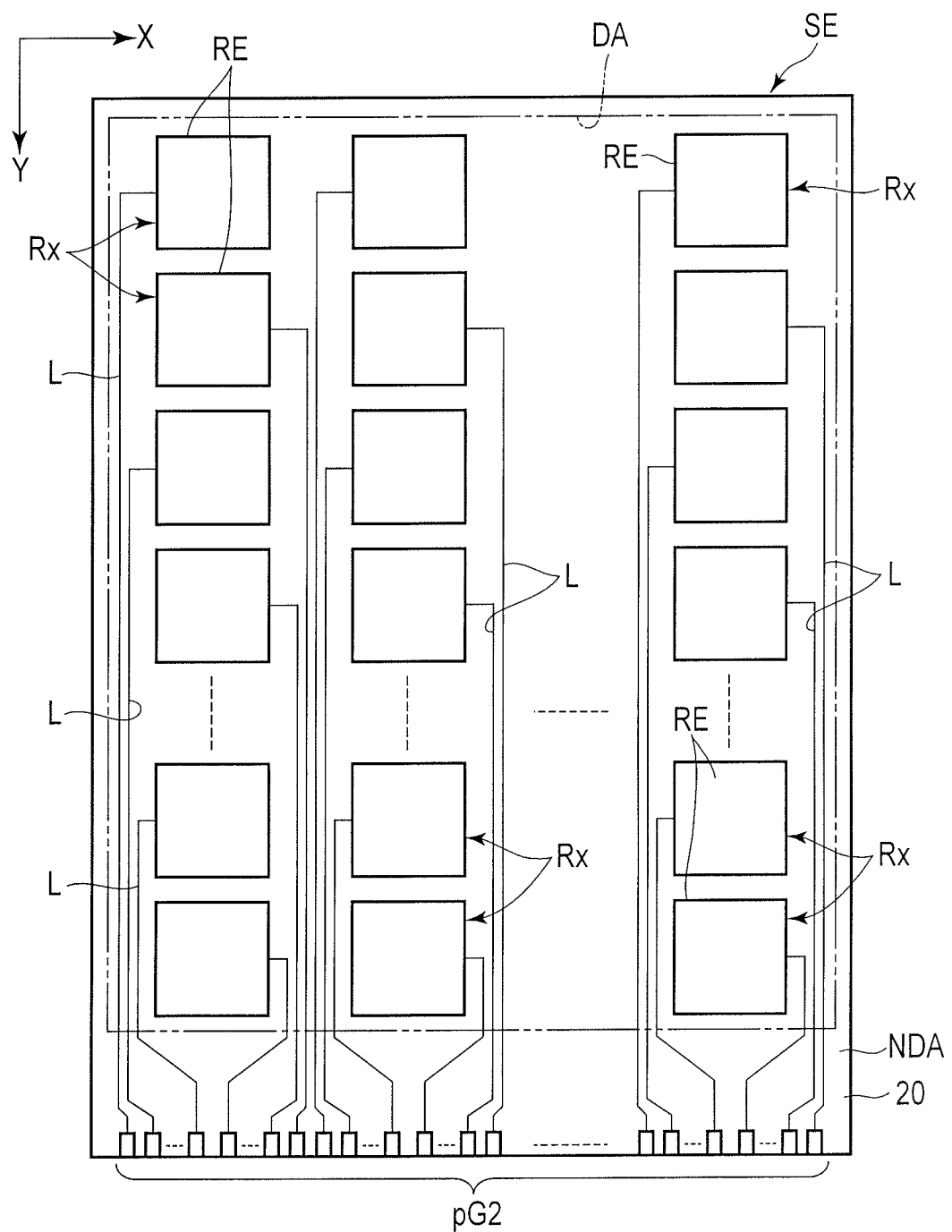
FIG. 7 is a plan view which schematically illustrates the structure of the electrostatic capacitance-type sensor.

FIG. 7 is a plan view which schematically illustrates the structure of the electrostatic capacitance-type sensor SE. As illustrated in FIG. 7, the sensor SE is provided on the liquid crystal display panel PNL. The sensor SE includes a plurality of detection electrodes Rx and a plurality of lead lines L.

The plural detection electrodes Rx are mutually electrically dependently provided above the outer surface (display surface) of the second insulative substrate 20. The plural detection electrodes Rx are provided in a matrix along the first direction X and second direction Y. In this embodiment, each detection electrode Rx is formed of a transparent electrode RE alone. The transparent electrode RE is formed of a transparent, electrically conductive material such as ITO or IZO. In this embodiment, each of the plural transparent electrodes RE has a uniform size. The detection electrode Rx detects a variation in electrostatic capacitance. Incidentally, as illustrated in another embodiment to be described later, there is a case in which the detection electrode Rx is formed of an aggregate of the transparent electrode RE and metal lines (branch lines LB), or there is a case in which the detection electrode Rx is formed of the metal lines (branch lines LB) alone. Lead lines L are provided above the outer surface of the second insulative substrate 20. The lead lines L are connected to the detection electrodes Rx in a one-to-one correspondence. The lead lines L are formed of a metal. The plural lead lines L are located at intervals and are electrically insulated from each other.

On the other hand, an OLB pad group pG2 is formed in the non-display area NDA of the outer surface of the second insulative substrate 20. The lead lines L are connected to pads of the OLB pad group pG2 in a one-to-one correspondence.

Next, a method of driving the liquid crystal display device DSP is described. In this example, a description is given of a method of determining input position information by utilizing the sensor SE. The liquid crystal display device DSP can determine input position information, based on a variation of electrostatic capacitance sensed in the detection electrodes Rx, by effecting switching between a self-capacitive sensing method and a mutual-capacitive sensing method. Thereby, it is possible to detect that a finger is in contact with the outer surface of the liquid crystal display device DSP, or that a finger is in close proximity to this outer surface. In this embodiment, this outer surface is the outer surface of the second optical element OD2.

(Self-Capacitive Sensing Method)

To begin with, the determination of input position information by the self-capacitive sensing method is performed by writing a write signal in each detection electrode Rx and reading a read signal which is indicative of a variation in electrostatic capacitance occurring in each detection electrode Rx in which the write signal has been written.

Next, the principle of the self-capacitive sensing method is explained by referring to FIG. 8A, FIG. 8B, FIG. 9A, FIG. 9B, FIG. 10A, FIG. 10B and FIG. 11. The self-capacitive sensing method makes use of a capacitance Cx1 which is possessed by the detection electrode Rx. In addition, the self-capacitive sensing method makes use of a capacitance Cx2 which occurs due to, for instance, a user's finger which is in close proximity to the detection electrode Rx.

Figure 8A:
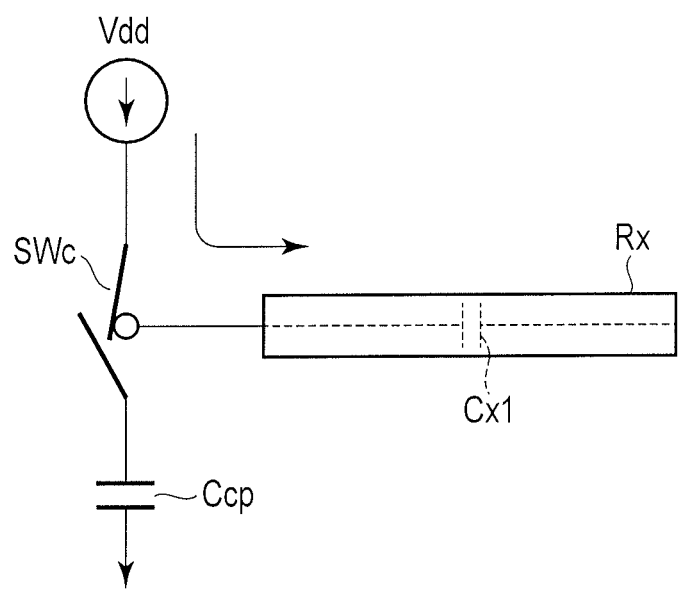
FIG. 8A is a view for explaining a self-capacitive sensing method which is applicable to the liquid crystal display device according to the first embodiment, FIG. 8A being a view illustrating a state in which a detection electrode is being charged in a case where no electrostatic capacitive coupling occurs between the detection electrode and a finger.
Figure 8B:
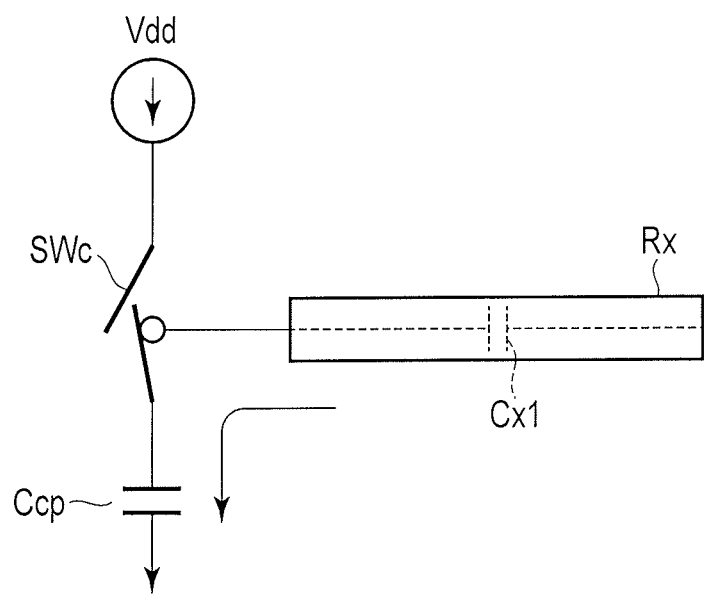
FIG. 8B is a view for explaining the self-capacitive sensing method in subsequence to FIG. 8A, FIG. 8B being a view illustrating a state in which the detection electrode is being discharged.

FIG. 8A and FIG. 8B illustrate a state in which the user's finger is neither in contact with, nor in close proximity to, the outer surface of the liquid crystal display device DSP. Thus, no electrostatic capacitive coupling occurs between the detection electrode Rx and the finger. FIG. 8A illustrates a state in which a power supply Vdd and the detection electrode Rx are connected by a control switch SWc. FIG. 8B illustrates a state in which the power supply Vdd and the detection electrode Rx are disconnected by the control switch SWc, and the detection electrode Rx is connected to a capacitor Ccp.

In the state of FIG. 8A, for example, the capacitance Cx1 is charged, and in the state of FIG. 8B, for example, the capacitance Cx1 is discharged. In this case, that the capacitance Cx1 is charged means that a write signal is written in the detection electrode Rx. In addition, that the capacitance Cx1 is discharged means that a read signal, which is indicative of a variation in electrostatic capacitance occurring in the detection electrode Rx, is read.

On the other hand, FIG. 9A and FIG. 9B illustrate a state in which the user's finger is either in contact with, or in close proximity to, the outer surface of the liquid crystal display device DSP. Thus, electrostatic capacitive coupling occurs between the detection electrode Rx and the finger. FIG. 9A illustrates a state in which the power supply Vdd and the detection electrode Rx are connected by the control switch SWc. FIG. 9B illustrates a state in which the power supply Vdd and the detection electrode Rx are disconnected by the control switch SWc, and the detection electrode Rx is connected to the capacitor Ccp.

In the state of FIG. 9A, for example, the capacitance Cx1 is charged, and in the state of FIG. 9B, for example, the capacitance Cx1 is discharged.

In this case, because of the presence of the capacitance Cx2, the voltage variation characteristic of the capacitance Ccp at the time of discharge illustrated in FIG. 9B is obviously different from the voltage variation characteristic of the capacitance Ccp at the time of discharge illustrated in FIG. 8B. Accordingly, in the self-capacitive sensing method, the input position information (e.g. the presence/absence of an operation input) is determined by making use of the fact that the voltage variation characteristic of the capacitance Ccp differs depending on the presence/absence of the capacitance Cx2.

FIG. 10A illustrates an example of a basic structure which realizes the self-capacitive sensing method. This circuit is provided, for example, in the driving IC chip IC2 illustrated in FIG. 1.

As illustrated in FIG. 10A, the detection electrode Rx is connected to one terminal of a capacitance Cp for voltage division, and is also connected to one input terminal of a comparator COMP. The detection electrode Rx has its own capacitance Cx.

The other input terminal of the comparator COMP is connected to a supply terminal of a comparative voltage Vref.

The other terminal of the capacitance Cp is connected to a power supply line of a voltage Vcc via a switch SW1. In addition, the other terminal of the capacitance Cp is connected to one terminal of a capacitance Cc via a resistor Rc. The other terminal of the capacitance Cc is connected to a reference potential (e.g. ground potential).

A switch SW2 is connected between the other terminal of the capacitance Cp and the reference potential, and a switch SW3 is connected between the one terminal of the capacitance Cp and the reference potential. The switches SW1, SW2 and SW3 and the comparator COMP are provided within the control circuit.

Next, the operation is described. The switch SW1 is turned on at fixed cycles, and can charge the capacitance Cc. When the capacitance Cc is charged, the switches SW2 and SW3 are turned off. When the capacitance Cc has been charged, the switches SW1, SW2 and SW3 are all turned off, and the charge of the capacitance Cc is retained.

Subsequently, the switches SW2 and SW3 are turned on for a predetermined time (the switch SW1 is kept in the OFF state). Then, the charge of the capacitance Cp, Cx is almost discharged, and part of the charge of the capacitance Cc is discharged via the resistor Rc.

Following the above, the switches SW1, SW2 and SW3 are all turned off. Then, the charge of the capacitance Cc shifts to the capacitance Cp, Cx. An equivalent circuit at this time can be represented as illustrated in FIG. 10B. Thereafter, in the comparator COMP, a voltage Vx of the capacitance Cx is compared with the comparative voltage Vref or threshold voltage Vth.

As indicated by the equivalent circuit of FIG. 10, if the switches SW1, SW2 and SW3 are all turned off, the charge of the capacitance Cc shifts to the capacitance Cp, Cx, and then the variation of the voltage Vx of the capacitance Cx is repeatedly compared with the comparative voltage Vref in the comparator COMP.

Specifically, the switches SW2 and SW3 are turned on for a predetermined time (the switch SW1 is kept in the OFF state). Then, the charge of the capacitance Cp, Cx is almost discharged, and part of the charge of the capacitance Cc is discharged via the resistor Rc. Following this, the switches SW1, SW2 and SW3 are all turned off. Then, the charge of the capacitance Cc shifts to the capacitance Cp, Cx.

The relationship between the voltage Vp, Vc, Vx and the capacitance Cp, Cc, Cx is expressed by the following equations (1) to (3):

$$Vc = Vp + Vx \quad (1)$$

$$Vp : Vx = (1/Cp) : (1/Cx) \quad (2)$$

$$Vx = (Cp/(Cp+Cx)) \times Vc \quad (3)$$

As described above, after the capacitance Cc is charged up to the voltage Vc via the switch SW1, if the switches SW1, SW2 are repeatedly turned on/off, the voltage Vc of the capacitance Cc gradually decreases, and also the voltage Vx of the capacitance Cx gradually decreases. This operation, that is, the operation in which the switches SW1, SW2 are repeatedly turned on/off after the capacitance Cc is charged up to the voltage Vc, is continued until the voltage Vx becomes lower than the comparative voltage Vref.

FIG. 11 illustrates an example of a variation waveform of the voltage Vc of the capacitance Cc and an output waveform of the comparator COMP. The abscissa indicates time, and the ordinate indicates voltage.

As illustrated in FIG. 10A and FIG. 11, if the switch SW1 is turned on, the capacitance Cc is charged up to the voltage Vcc. Then, the switches SW1, SW2 and SW3 are all turned off, and the charge of the capacitance Cc shifts to the capacitance Cp, Cx. Subsequently, the variation of the voltage Vx of the capacitance Cx is compared with the comparative voltage Vref in the comparator COMP.

The characteristic of variation or the degree of conversion of the voltage Vc varies in accordance with the sum of the capacitance Cp and the capacitance Cx. In addition, the variation of the capacitance Cc affects the voltage Vx of the capacitance Cx. Besides, the value of the capacitance Cx varies in accordance with the degree of the approach of the user's finger to the detection electrode Rx.

Thus, as illustrated in FIG. 11, when the finger is far from the detection electrode Rx, a characteristic VCP1 involving a slow variation is exhibited. When the finger is near the detection electrode Rx, a characteristic VCP2 involving a quick variation is exhibited. The reason why the ratio of decrease of Vc is larger in the case where the finger is near the detection electrode Rx than in the case where the finger is far from the detection electrode Rx is that the value of the capacitance Cc has been increased by the capacitance of the finger.

The comparator COMP compares the voltage Vp with the comparative voltage Vref or threshold voltage Vth, in synchronism with the repeated ON/OFF of the switches SW1 and SW2. When Vp>Vref, the comparator COMP produces an output pulse. However, if Vp becomes Vp<Vref, the comparator COMP stops the output pulse.

The output pulse of the comparator COMP is monitored by a measuring circuit or a measuring application (not shown). Specifically, after one-time charging for the capacitance Cc, repeated discharge in a short period is executed by the switches SW1 and SW2, and the value of the voltage Vp is repeatedly measured.

At this time, the period (MP1 or MP2), in which output pulses of the comparator COMP are obtained, may be measured, or the number of output pulses of the comparator COMP (the number of pulses from when Cc is charged to when Vp becomes Vp<Vref) may be measured.

The period is long when the finger is far from the detection electrode Rx, and the period is short when the finger is near the detection electrode Rx. Alternatively, the number of output pulses of the comparator COMP is large when the finger is far from the detection electrode Rx, and the number of output pulses of the comparator COMP is small when the finger is near the detection electrode Rx.

Hence, the degree of the approach of the finger to the plane of the sensor SE can be determined by the level of the detection pulse. At the same time, a two-dimensional position of the finger on the plane of the sensor SE can be detected since the detection electrodes Rx are arranged two-dimensional (in a matrix).

As described above, although it is detected whether the user's finger affects the detection electrode Rx or not, the time for this detection is on the order of several-ten µs to several ms.

Mutual-Capacitive Sensing Method

To begin with, the determination of input position information by the mutual-capacitive sensing method is performed by writing a write signal in each divisional electrode C and reading a read signal which is indicative of a variation in electrostatic capacitance occurring in each detection electrode Rx. The divisional electrode C (common electrode CE) is also used as a part of the sensor SE.

Figure 12:
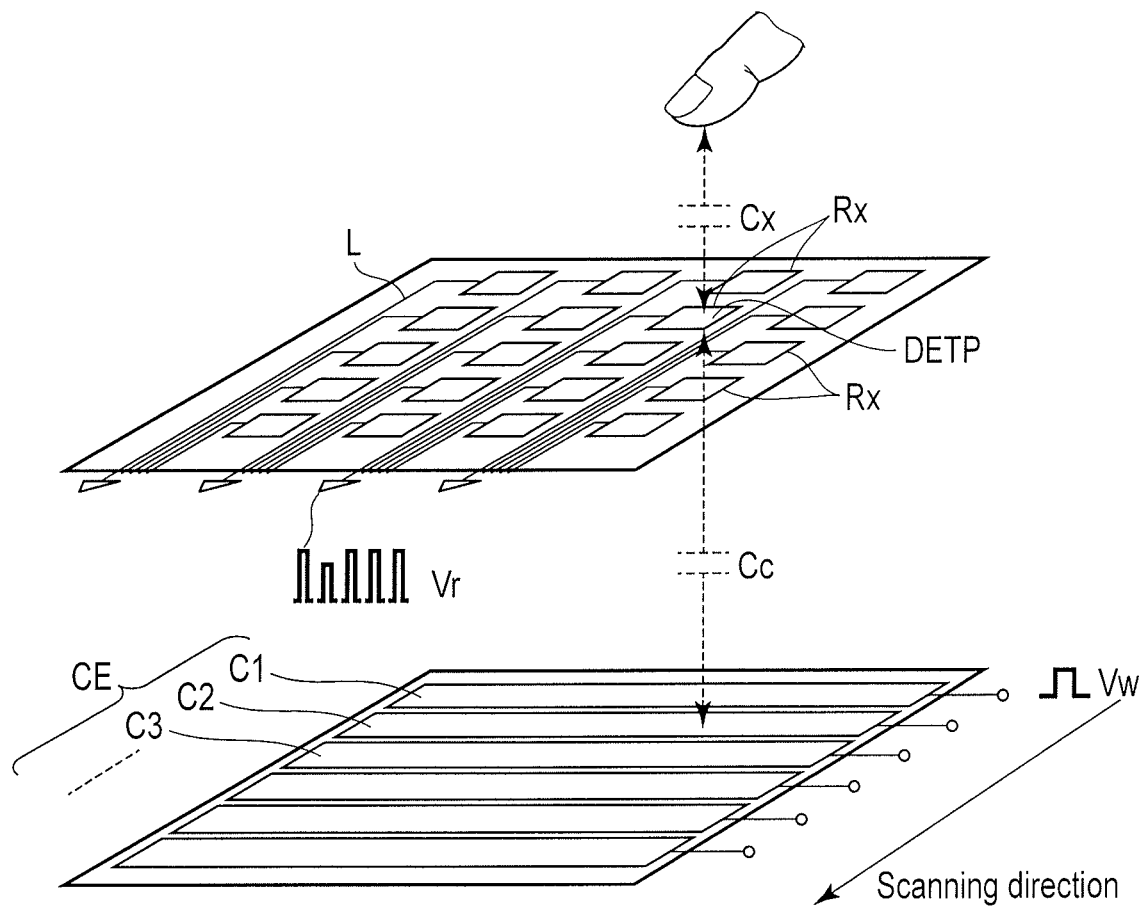
FIG. 12 is a perspective view illustrating a plurality of divisional electrodes and a plurality of detection electrodes of the above-described liquid crystal display device, FIG. 12 being a view for explaining an example of a mutual-capacitive sensing method.

Next, the principle of the mutual-capacitive sensing method is explained by referring to FIG. 12. FIG. 12 illustrates a typical basic structure of the mutual-capacitive sensing method.

As illustrated in FIG. 12, the common electrode CE and detection electrodes Rx are utilized. The common electrode CE includes a plurality of stripe-shaped divisional electrodes C (C1, C2, C3, . . . ). These plural divisional electrodes C are arranged in a scanning (driving) direction (the second direction Y in this example).

On the other hand, the detection electrodes Rx include matrix-arranged detection electrodes Rx. In this example, the detection electrodes Rx are arranged in the first direction X and the second direction Y. The plural detection electrodes Rx are opposed to the divisional electrodes C with a distance. Thus, a capacitance Cc is basically present between the divisional electrodes C and detection electrodes Rx.

The divisional electrodes C are scanned by a pulse-shaped write signal Vw at predetermined cycles. In this example, it is assumed that the user's finger exists in close proximity to a specific detection electrode Rx. In this case, when the pulse-shaped write signal Vw has been supplied to the divisional electrode C, a pulse-shaped read signal Vr having a lower level than pulses, which are obtained from other detection electrodes, is obtained from the specific detection electrode Rx.

In the case of the mutual-capacitive sensing method, the detection electrode Rx detects the potential of a fringe electric field from the divisional electrode C. If a conductor, such as the finger, approaches the detection electrode Rx, this fringe electric field becomes weaker. Thereby, the potential of the detection electrode Rx decreases. This is the principle of the mutual-capacitive sensing method.

In the mutual-capacitive sensing method, the pulse-shaped read signal Vr with the low detection level can be treated as information (detection pulse) of an input position DETP by the finger.

The above-described capacitance Cx differs between the case where the finger is near the detection electrode Rx and the case where the finger is far from the detection electrode Rx. Accordingly, the level of the detection pulse also differs between the case where the finger is near the detection electrode Rx and the case where the finger is far from the detection electrode Rx. Hence, the degree of the approach of the finger to the plane of the sensor SE can be determined by the voltage level of the pulse-shaped read signal Vr. Needless to say, two-dimensional information of the finger on the plane of the sensor SE can be detected by the electrode driving timing by the pulse-shaped write signal Vw and the output timing of the pulse-shaped read signal Vr.

Incidentally, in this case, the detection electrode Rx do not need to be divided in a matrix. It is preferable to electrically connect the detection electrodes Rx in a direction crossing the divisional electrodes C by using switches, etc. Thereby, the number of detectors, which are used for detecting the read signal Vr in the mutual-capacitive sensing method, can be greatly reduced.

Figure 13:
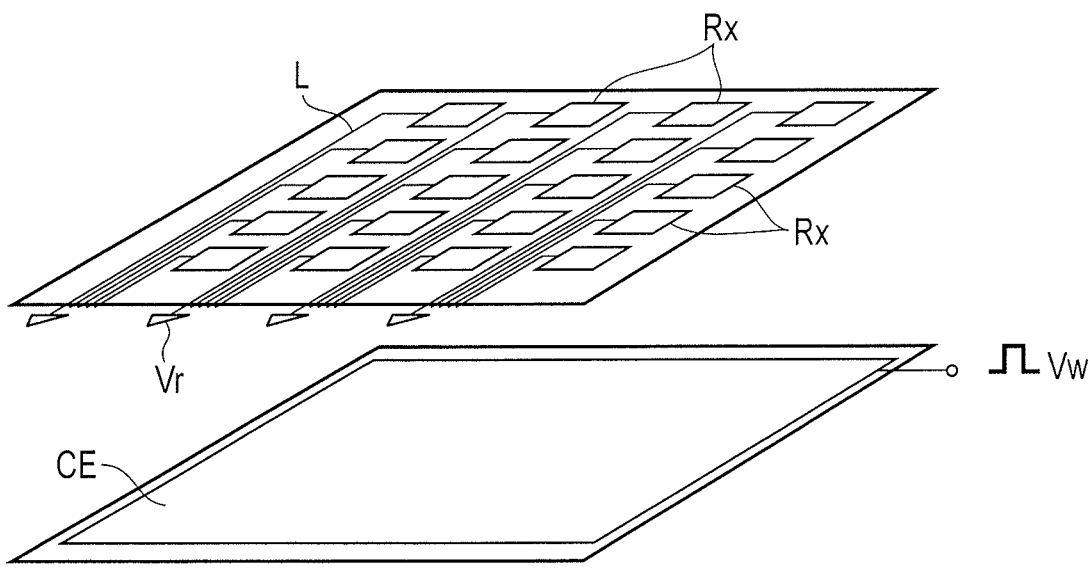
FIG. 13 is a perspective view illustrating a common electrode and a plurality of detection electrodes of a modification of the above-described liquid crystal display device, FIG. 13 being a view for explaining another example of the mutual-capacitive sensing method.

In the meantime, as illustrated in FIG. 13, the common electrode CE may not be divided into plural parts. The common electrode CE is formed of a single electrode (solid electrode) and is shared by all pixels PX. In this case, too, by delivering the write signal Vw to the common electrode CE, the liquid crystal display device DSP can determine the input position information, with the switching to the mutual-capacitive sensing method. As a matter of course, the liquid crystal display device DSP can determine the input position information, with the switching to the self-capacitive sensing method. According to the electrostatic capacitance-type sensor-equipped liquid crystal display device DSP and the method of driving the same according to the first embodiment, which is constructed as described above, the liquid crystal display device DSP includes the liquid crystal display panel PNL with a display surface which displays an image, the electrostatic capacitance-type sensor SE provided on the liquid crystal display panel PNL, and the control module CM.

The sensor SE includes the plural detection electrodes Rx and plural lead lines L. The plural detection electrodes Rx are mutually electrically independently provided in a matrix above the display surface of the liquid crystal display panel PNL. The detection electrodes Rx are formed of only the transparent electrodes RE which are formed of a transparent, electrically conductive material. The detection electrode Rx detects a variation in electrostatic capacitance. The plural lead lines L are provided above the display surface of the liquid crystal display panel PNL, are connected to the plural detection electrodes Rx in a one-to-one correspondence, and are formed of a metal.

The control module CM is connected to the plural lead lines L. The control module CM writes a write signal Vw in each detection electrode Rx, reads a read signal Vr which is indicative of a variation in electrostatic capacitance occurring in each detection electrode Rx in which the write signal Vw has been written, and determines the input position information, based on the variation in electrostatic capacitance.

The detection electrodes Rx are provided in a matrix, and a variation in electrostatic capacitance occurring in each detection electrode Rx is independently detected. Compared to the case in which the detection electrode Rx is formed in a strip shape, the sensitivity of the sensor SE can be enhanced. Thus, the sensor SE can perform multi-touch detection and close-proximity detection, as well as single-touch detection.

In addition, even when the detection electrodes Rx (transparent electrodes RE) are arranged in a matrix, the liquid crystal display device DSP with excellent detection precision of input position information can be obtained. A reason for this is that the width of the lead line L can be reduced by forming the lead line L of a metallic material having a much lower electrical resistance value that a transparent, electrically conductive material. Another reason for this is that the plural detection electrodes Rx can be formed with a substantially uniform size since the lead line L has the small width. Still another reason for this is that an undesirable parasitic capacitance does not easily occur between the lead line L and the finger since the lead line L has the small width. Specifically, the influence of a noise component becomes very small, and the noise component can be ignored.

Furthermore, although the lead line L has a light-shield property, since the lead line L can be formed with small thickness, an adverse effect on image display hardly occurs. Besides, since the lead line L can be formed with smaller thickness, the size of each transparent electrode RE can be made larger by that much. Incidentally, since the transparent electrode RE has transparency, an adverse effect on image display hardly occurs even if the size is made larger.

As described above, by forming the detection electrodes Rx in a matrix and forming the lead lines L by making use of a metallic material, a variance in detection precision of input position information can be suppressed.

Moreover, the sensor SE (detection electrodes Rx, lead lines L) can be formed above the outer surface of the second insulative substrate 20. Thus, compared to the case in which the sensor SE is formed by using a substrate different from the second insulative substrate 20, the thickness of the liquid crystal display device DSP can be reduced.

From the above, it is possible to obtain the electrostatic capacitance-type sensor-equipped liquid crystal display device DSP and the method of driving the same with excellent detection precision of input position information.

Second Embodiment

Figure 14:
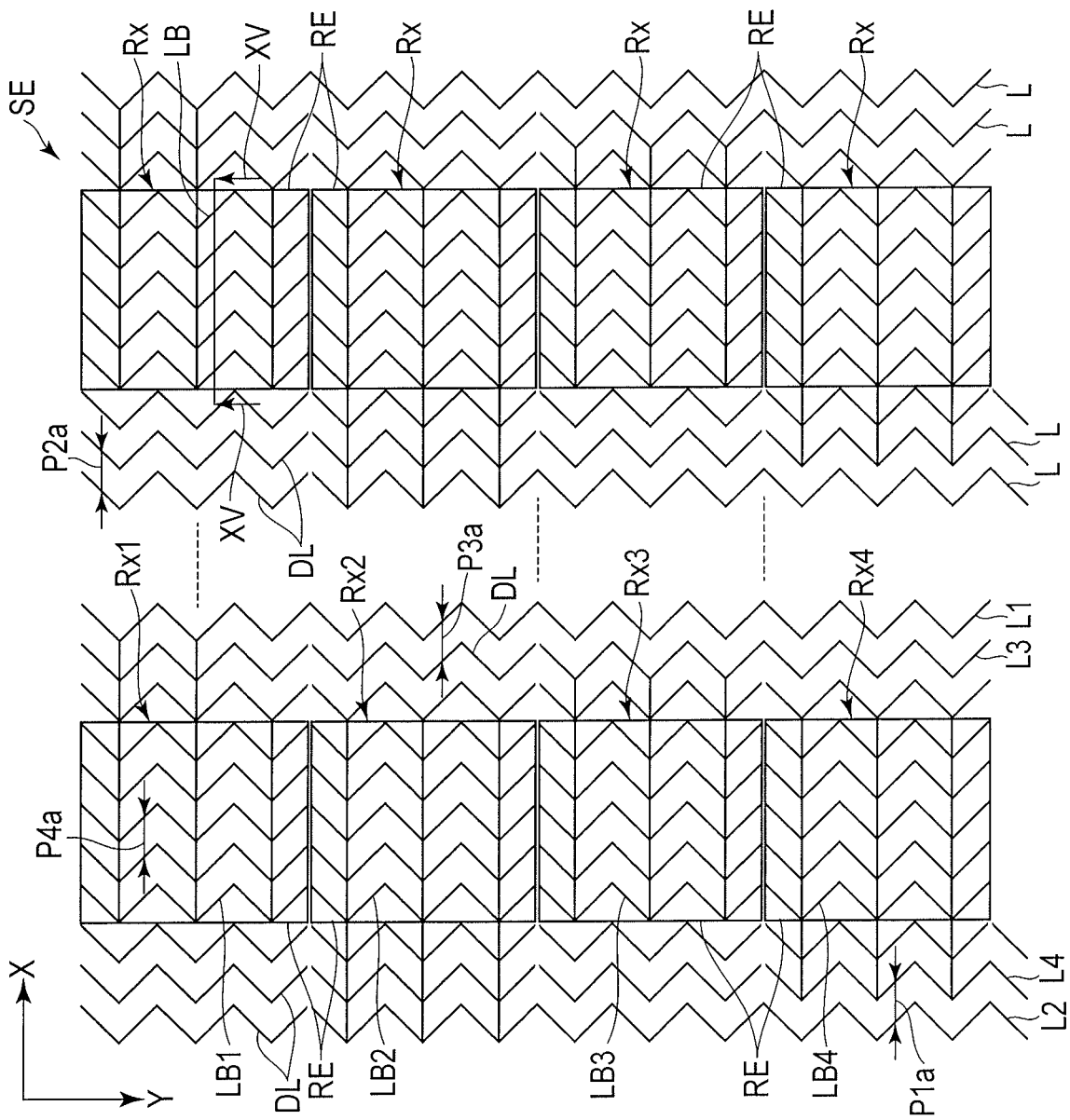
FIG. 14 is a plan view which schematically illustrates an electrostatic capacitance-type sensor of a liquid crystal display device according to a second embodiment, FIG. 14 being a view illustrating a layout of detection electrodes, lead lines and dummy lines.

Next, a detailed description is given of an electrostatic capacitance-type sensor-equipped display device DSP according to a second embodiment, and a method of driving the same. FIG. 14 is a plan view which schematically illustrates an electrostatic capacitance-type sensor SE of the liquid crystal display device DSP according to this embodiment, FIG. 14 being a view illustrating a layout of detection electrodes Rx, lead lines L and dummy lines DL.

As illustrated in FIG. 14, the liquid crystal display device DSP according to this embodiment is formed like the above-described liquid crystal display device according to the first embodiment, except that dummy lines DL are added to the sensor SE, and the layout of the sensor SE is different.

Detection electrodes Rx are arranged in the first direction X and second direction Y, and are disposed in a matrix. In this embodiment, the detection electrode Rx is formed of an aggregate of a transparent electrode RE and branch lines LB. The sizes of plural transparent electrodes RE are uniform. In the example illustrated, each of the transparent electrode RE is formed in a rectangular shape, but the shape thereof is not limited to this example.

Lead lines L are disposed to be arranged in the first direction X. In addition, the lead line L includes branch lines LB which are branched at a distal end thereof. At least a part of the branch lines LB overlaps the transparent electrode RE. The branch lines LB are located immediately below one corresponding transparent electrode RE of the plural transparent electrodes RE, and are in contact with this transparent electrode RE. In the example illustrated, each of the lead lines L has such a shape that wavy lines, which obliquely cross the first direction X, and straight lines, which are parallel to the first direction X, are combined. However, the shape of the lead line L is not limited to this illustrated example. Incidentally, the wavy lines cross the first direction X, for example, at an angle of about 45°.

In this case, there arises no problem even if the direction of arrangement of pixels PX (the first direction X or second direction Y) and metal lines are perfectly in parallel. However, there may be a case in which the metal lines and the direction of arrangement of pixels PX cross at an angle of a several-degree level. In the above case, moire occurs in many cases and a very large cyclic pattern is visually recognized. In order to prevent this situation, use is often made of a method in which, as in the present embodiment, metal lines are disposed in advance at an angle to the direction of arrangement of pixels PX, and moire is made very fine, so that moire cannot be visually recognized.

The wavy lines are separated at respective locations, and dummy lines DL, which are connected to none of lead lines L, are disposed between the lead lines L and transparent electrodes RE. The dummy lines DL are in an electrically floating state. Like the lead lines L, the dummy lines DL are provided above the surface of the liquid crystal display panel PNL and are formed of a metal. For example, the lead lines L and dummy lines DL are formed of the same material at the same time. The dummy lines DL maintain an insulation state between the transparent electrodes RE, an insulation state between the lead lines L, and an insulation state between the transparent electrodes RE and lead lines L.

Detection electrodes Rx1 to Rx4 in the Figure are arranged in the second direction Y. Odd-numbered lead lines L1 and L3 are located on one end side (the right side in the Figure) of the detection electrodes Rx, and even-numbered lead lines L2 and L4 are located on the other side (the left side in the Figure) of the detection electrodes Rx. A lead line L1 includes branch lines LB1, a lead line L2 includes branch lines LB2, a lead line L3 includes branch lines LB3, and a lead line L4 includes branch lines LB4.

The detection electrode Rx1 includes the branch lines LB1 and the transparent electrode RE overlapping the branch lines LB1, and is electrically connected to the lead line L1. Similarly, the detection electrode Rx2 includes the branch lines LB2 and the transparent electrode RE overlapping the branch lines LB2, and is electrically connected to the lead line L2. The detection electrode Rx3 includes the branch lines LB3 and the transparent electrode RE overlapping the branch lines LB3, and is electrically connected to the lead line L3. The detection electrode Rx4 includes the branch lines LB4 and the transparent electrode RE overlapping the branch lines LB4, and is electrically connected to the lead line L4.

Such sets of detection electrodes Rx1 to Rx4 and lead lines L1 to L4 are arranged in the first direction X.

In addition, it is preferable that wavy lines neighboring in the first direction X are arranged with an equal pitch in the first direction X. These wavy lines are the metal lines which comprehensively include the lead lines L (branch lines LB) and dummy lines DL. Examples of the pitch in the first direction X of the wavy lines include the following first pitch P1a, second pitch P2a, third pitch P3a and fourth pitch P4a.

The first pitch P1a is a pitch in the first direction X of plural lead lines L. The second pitch P2a is a pitch in the first direction X of plural dummy lines DL. The third pitch P3a is a pitch in the first direction X of the mutually neighboring lead line L and dummy line DL of the plural lead lines L and plural dummy lines DL. The fourth pitch P4a is a pitch in the first direction X of plural branch lines LB of the lead lines L.

Then, it is preferable that the first pitch P1a, second pitch P2a, third pitch P3a and fourth pitch P4a are identical.

In addition, it is preferable that each of the first pitch P1a, second pitch P2a, third pitch P3a and fourth pitch P4a is an integer-number of times of the pixel pitch in the first direction X. Since no moire occurs at large cycles due to an interference between the metal lines of the sensor SE and the pixels PX, the pattern of the metal lines of the sensor SE can surely be made less visible.

The pixel pitch, in this context, corresponds to, for example, a pitch Pu of pixels PX shown in FIG. 4. In other words, the pitch Pu is the pitch in the first direction X of the centers of source lines S.

Figure 15:
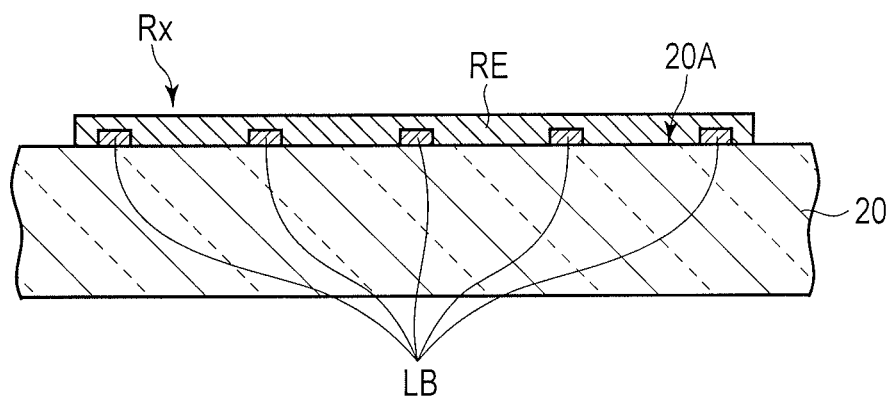
FIG. 15 is a cross-sectional view which schematically illustrates a structure at a time when the electrostatic capacitance-type sensor illustrated in FIG. 14 is cut along line XV-XV.

FIG. 15 is a cross-sectional view which schematically illustrates a structure at a time when the electrostatic capacitance-type sensor SE illustrated in FIG. 14 is cut along line XV-XV.

As illustrated in FIG. 15, the branch lines LB of lead lines L are formed on an outer surface 20A of the second insulative substrate 20. The transparent electrode RE is formed on the outer surface 20A, and directly covers the branch lines LB. Thus, the transparent electrode RE is electrically connected to the lead line L.

According to the electrostatic capacitance-type sensor-equipped liquid crystal display device DSP and method of driving the same according to the second embodiment, which is constructed as described above, the liquid crystal display device DSP includes the liquid crystal display panel PNL with a display surface which displays an image, the electrostatic capacitance-type sensor SE provided on the liquid crystal display panel PNL, and the control module CM. Thus, in this embodiment, too, the same advantageous effects as obtained in the first embodiment can be obtained.

Furthermore, the lead line L includes the branch lines LB. The branch lines LB are located immediately below one corresponding transparent electrode RE of the plural transparent electrodes RE and are in contact with the transparent electrode RE. An aggregate of the transparent electrode RE and branch lines LB forms the detection electrode Rx. The electrical resistance value of the aggregate of the transparent electrode RE and branch lines LB is lower than the electrical resistance value of the transparent electrode RE alone. Thereby, the power consumption of the sensor SE can be reduced, and the high responsivity of the sensor SE can be realized.

Besides, by providing the metal lines (branch lines LB) at a position opposed to the transparent electrode RE, the non-uniformity in density of the metal lines (lead lines L (branch lines LB)) in the display area DA can be reduced. Thereby, the pattern of the metal lines can be made less visible to the user.

The sensor SE further includes a plurality of dummy lines DL which are provided above the display surface of the liquid crystal display panel PNL, are located in the display area DA, and are formed of a metal. Thereby, since the non-uniformity in density of the metal lines (lead lines L (branch lines LB)) in the display area DA can be further reduced, the pattern of the metal lines can be made still less visible to the user.

Besides, as described above, the first pitch P1a, second pitch P2a, third pitch P3a and fourth pitch P4a in the first direction X may be identical. The reason for this is that, by making the pattern of metal lines uniform, the pattern can be made still less visible.

Alternatively, as described above, each of the first pitch P1a, second pitch P2a, third pitch P3a and fourth pitch P4a may be an integer-number of times of the pixel pitch in the first direction X. A reason for this is that the occurrence of moire can be prevented. Another reason for this is that the non-uniformity in the light transmission amount of pixels PX of the respective colors or in the light shield area can be reduced.

Alternatively, the first pitch P1a, second pitch P2a, third pitch P3a and fourth pitch P4a in the first direction X may be identical, and each of the first pitch P1a, second pitch P2a, third pitch P3a and fourth pitch P4a in the first direction X may be an integer-number of times of the pixel pitch in the first direction X.

A reason for this is that the pattern of metal lines can be made still less visible. Another reason for this is that the occurrence of moire can be prevented. Still another reason for this is that the non-uniformity in the light transmission amount of pixels PX of the respective colors or in the light shield area can be reduced.

Alternatively, the first pitch P1a, second pitch P2a, third pitch P3a and fourth pitch P4a in the first direction X may be varied in units of an area in the display area DA, and each of the first pitch P1a, second pitch P2a, third pitch P3a and fourth pitch P4a in the first direction X may be an integer-number of times of the pixel pitch in the first direction X. For example, each of the first pitch P1a, second pitch P2a, third pitch P3a and fourth pitch P4a in the first direction X in a predetermined area of the display area DA may be set to be three times the pixel pitch in the first direction X, and each of the first pitch P1a, second pitch P2a, third pitch P3a and fourth pitch P4a in the first direction X in another area of the display area DA may be set to be four times the pixel pitch in the first direction X. Although mentioned above, the pixel pitch, in this context, corresponds to, for example, the pitch Pu of pixels PX shown in FIG. 4.

From the above, it is possible to obtain the electrostatic capacitance-type sensor-equipped liquid crystal display device DSP and the method of driving the same with excellent detection precision of input position information.

Modification 1 of Second Embodiment

Figure 16:
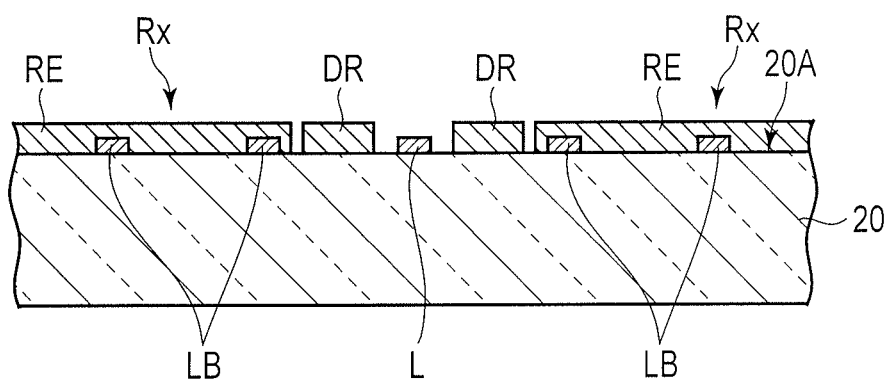
FIG. 16 is a cross-sectional view which schematically illustrates the structure of a part of Modification 1 of the electrostatic capacitance-type sensor according to the second embodiment.

Next, a description is given of Modification 1 of the electrostatic capacitance-type sensor SE according to the second embodiment. FIG. 16 is a cross-sectional view which schematically illustrates a structure of a part of Modification 1 of the sensor SE according to the second embodiment. As illustrated in FIG. 16, the sensor SE further includes a plurality of dummy electrodes DR. The dummy electrodes DR are provided above the display surface of the liquid crystal display panel PNL, and are located in the display area DA. In this example, the dummy electrodes DR are formed on the outer surface 20A of the second insulative substrate 20. The dummy electrodes DR are formed of a transparent, electrically conductive material such as ITO or IZO. For example, the transparent electrodes RE and dummy electrodes DR are formed of the same material at the same time. The dummy electrodes DR are in an electrically floating state.

The dummy electrodes DR are located between plural transparent electrodes RE. In this case, the dummy electrodes DR are located between lead lines L, between dummy lines DL, between the lead lines L and dummy lines DL, and between the lead lines L and transparent electrodes RE. Thus, the dummy electrodes DR are located at distances from the transparent electrodes RE, lead lines L and dummy lines DL. The dummy electrodes DR maintain the insulation state between the transparent electrodes RE, the insulation state between the lead lines L, and the insulation state between the transparent electrodes RE and lead lines L.

According to Modification 1 of the electrostatic capacitance-type sensor-equipped liquid crystal display device DSP according to the second embodiment, which is constructed as described above, the same advantageous effects as obtained in the second embodiment can be obtained.

By also providing the dummy electrodes DR between the transparent electrodes RE, the non-uniformity in density of the transparent conductive layers (transparent electrodes RE, dummy electrodes DR) in the display area DA can be reduced. Thereby, the pattern of the transparent conductive layers can be made less visible to the user.

Modification 2 of Second Embodiment

Figure 17A:
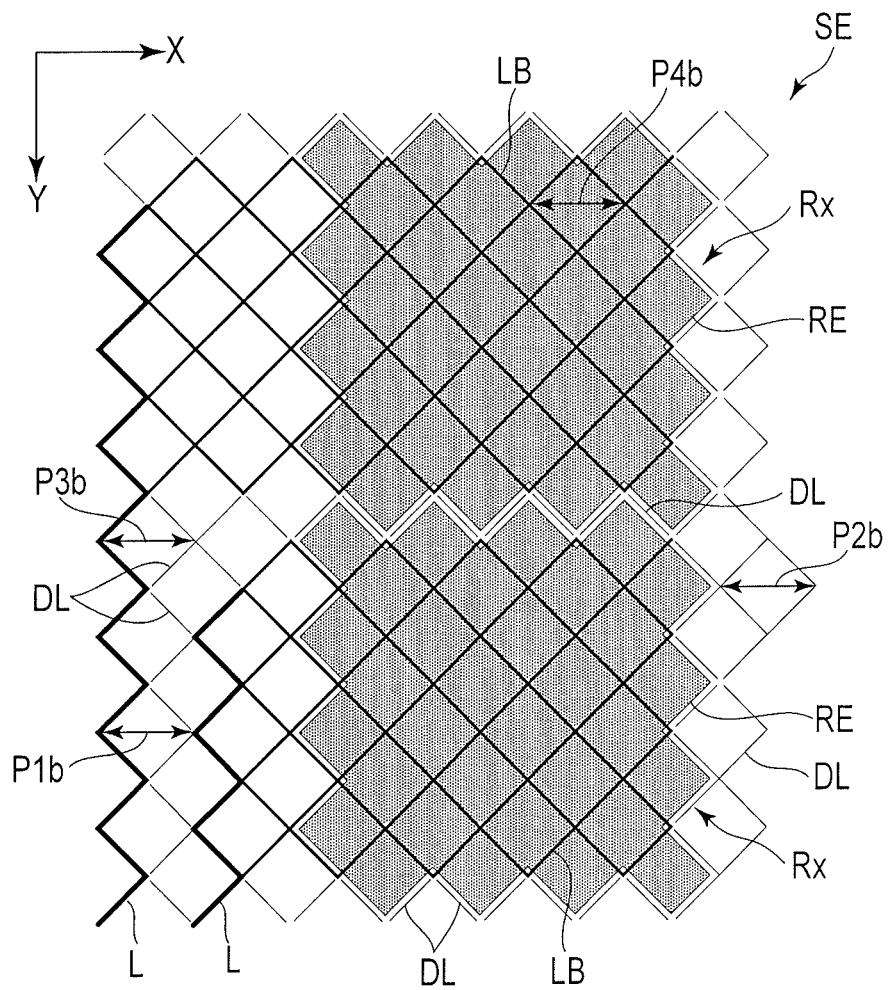
FIG. 17A is a plan view which schematically illustrates Modification 2 of the electrostatic capacitance-type sensor according to the second embodiment, FIG. 17A being a view illustrating a layout of detection electrodes, lead lines and dummy lines.

Next, a description is given of Modification 2 of the electrostatic capacitance-type sensor SE according to the second embodiment. FIG. 17A is a plan view which schematically illustrates Modification 2 of the sensor SE according to the second embodiment, FIG. 17A being a view illustrating a layout of detection electrodes Rx, lead lines L and dummy lines DL. The main line of the lead line L, the branch line LB of the lead line L, and the dummy line DL have the same width. However, in FIG. 17A, in order to visually distinguish the main line of the lead line L, the branch line LB of the lead line L, and the dummy line DL, the thicknesses of the respective lines are made different.

As illustrated in FIG. 17A, Modification 2 differs from the example illustrated in FIG. 14, in that the metal lines (lead lines L, dummy lines DL) are formed in a mesh shape. The detection electrode Rx is formed of an aggregate of the transparent electrode RE and branch lines LB. The branch lines LB cross the first direction X, for example, at an angle of about 45°. The transparent electrode RE is formed in a manner to cover the meshes of the branch lines LB, and has wavy sides along the branch lines LB at its four sides.

In addition, in this Modification 2, too, it is preferable that metal lines (lead lines L (branch lines LB), dummy lines DL) neighboring in the first direction X are arranged with an equal pitch in the first direction X. The pitch in the first direction X of the metal lines is a pitch of intersections of the metal lines. However, the intersections of the metal lines also include imaginary intersections. Specifically, the imaginary intersection is an intersection of imaginary extension lines of the metal lines. This is because the metal lines are dividedly formed. Examples of the pitch in the first direction X of the metal lines include the following first pitch P1b, second pitch P2b, third pitch P3b and fourth pitch P4b.

In this case, the first pitch P1b is a pitch in the first direction X of corners of plural lead lines L. The second pitch P2b is a pitch in the first direction X of intersections (corners) of plural dummy lines DL. The third pitch P3b is a pitch in the first direction X of corners of a lead line L and a dummy line DL which neighbor each other, among the plural lead lines L and plural dummy lines DL. The fourth pitch P4b is a pitch in the first direction X of intersections of plural branch lines LB of the lead lines L.

Then, it is preferable that the first pitch P1b, second pitch P2b, third pitch P3b and fourth pitch P4b are identical.

In addition, it is preferable that each of the first pitch P1b, second pitch P2b, third pitch P3b and fourth pitch P4b is an integer-number of times of the pixel pitch in the first direction X. The pixel pitch, too, in this context, corresponds to, for example, the pitch Pu of pixels PX shown in FIG. 4.

In Modification 2 of the electrostatic capacitance-type sensor-equipped liquid crystal display device DSP according to the second embodiment, which is constructed as described above, the same advantageous effects as obtained in the second embodiment can be obtained.

Modification 3 of Second Embodiment

Next, a description is given of Modification 3 of the electrostatic capacitance-type sensor SE according to the second embodiment. FIG. 17B is a plan view which schematically illustrates Modification 3 of the sensor SE according to the second embodiment, FIG. 17B being a view illustrating a layout of detection electrodes Rx, lead lines L and dummy lines DL. As illustrated in FIG. 17B, Modification 3 differs from the example illustrated in FIG. 17A, in that the sensor SE is formed without the transparent electrodes RE. The detection electrode Rx is formed of branch lines LB alone.

In Modification 3 of the electrostatic capacitance-type sensor-equipped liquid crystal display device DSP according to the second embodiment, which is constructed as described above, the same advantageous effects as obtained in Modification 2 of the second embodiment can be obtained.

Modification 4 of Second Embodiment

Figure 18:
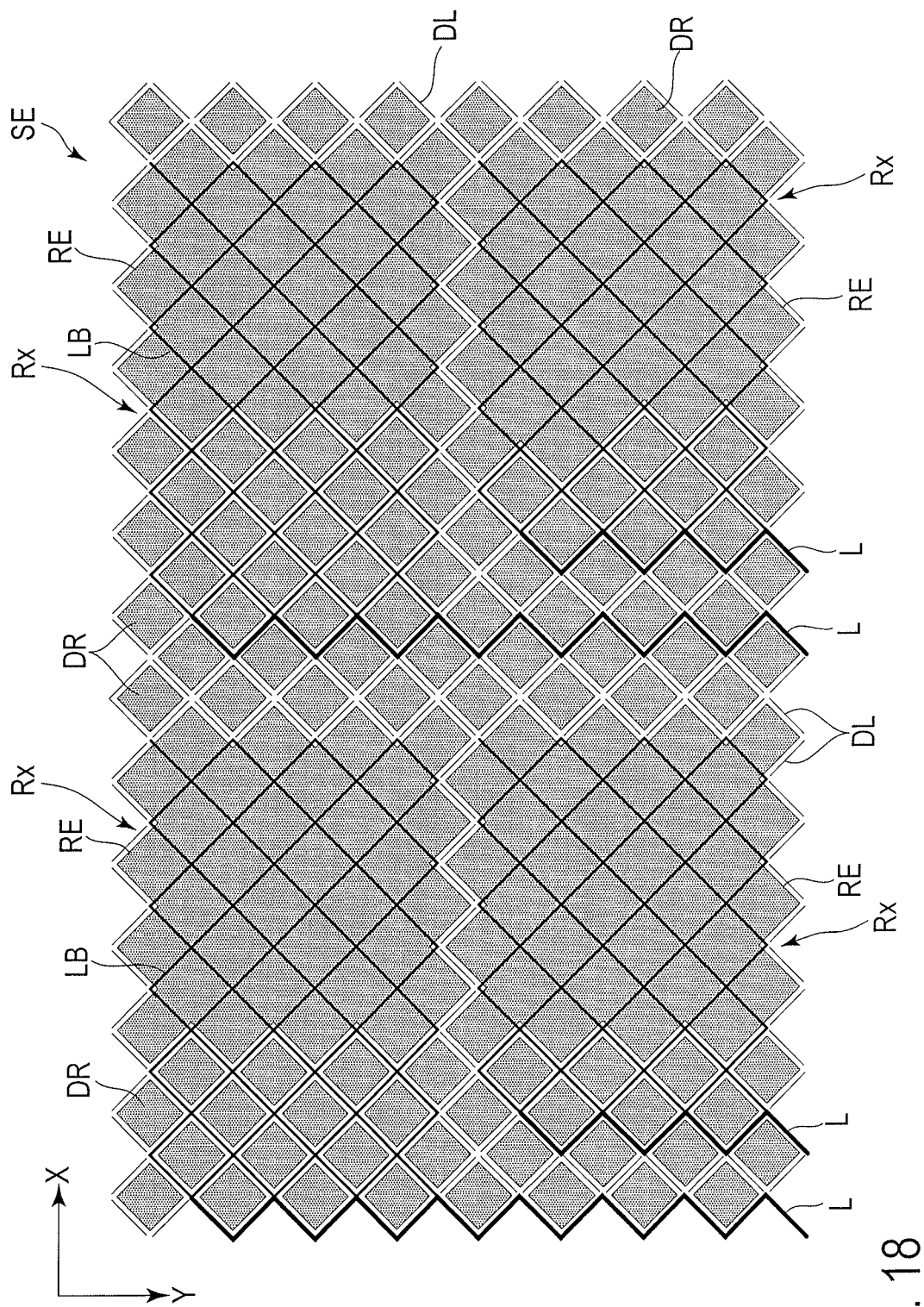
FIG. 18 is a plan view which schematically illustrates a part of Modification 4 of the electrostatic capacitance-type sensor according to the second embodiment, FIG. 18 being a view illustrating a layout of detection electrodes, lead lines, dummy electrodes and dummy lines.

Next, a description is given of Modification 4 of the electrostatic capacitance-type sensor SE according to the second embodiment. FIG. 18 is a plan view which schematically illustrates Modification 4 of the sensor SE according to the second embodiment, FIG. 18 being a view illustrating a layout of detection electrodes Rx, lead lines L, dummy electrodes DR and dummy lines DL. Incidentally, the main line of the lead line L, the branch line LB of the lead line L, and the dummy line DL have the same width. The detection electrode Rx is formed of an aggregate of the transparent electrode RE and branch lines LB.

As illustrated in FIG. 18, Modification 4 differs from the example illustrated in FIG. 17 in that the sensor SE includes a plurality of dummy electrodes DR. The dummy electrodes DR are provided above the display surface of the liquid crystal display panel PNL, and are located in the display area DA. In this example, the dummy electrodes DR are formed on the outer surface (20A) of the second insulative substrate 20. The dummy electrodes DR are formed of a transparent, electrically conductive material such as ITO or IZO. For example, the transparent electrodes RE and dummy electrodes DR are formed of the same material at the same time.

The dummy electrode DR is located between plural transparent electrodes RE. In this case, the dummy electrodes DR are located between lead lines L, between dummy lines DL, and between the lead lines L and dummy lines DL. Thus, the dummy electrodes DR are located at distances from the transparent electrodes RE, lead lines L and dummy lines DL. The dummy electrodes DR maintain the insulation state between the transparent electrodes RE, the insulation state between the lead lines L, and the insulation state between the transparent electrodes RE and lead lines L.

In Modification 3 of the electrostatic capacitance-type sensor-equipped liquid crystal display device DSP according to the second embodiment, which is constructed as described above, the same advantageous effects as obtained in Modification 1 of the second embodiment can be obtained.

Third Embodiment

Figure 19:
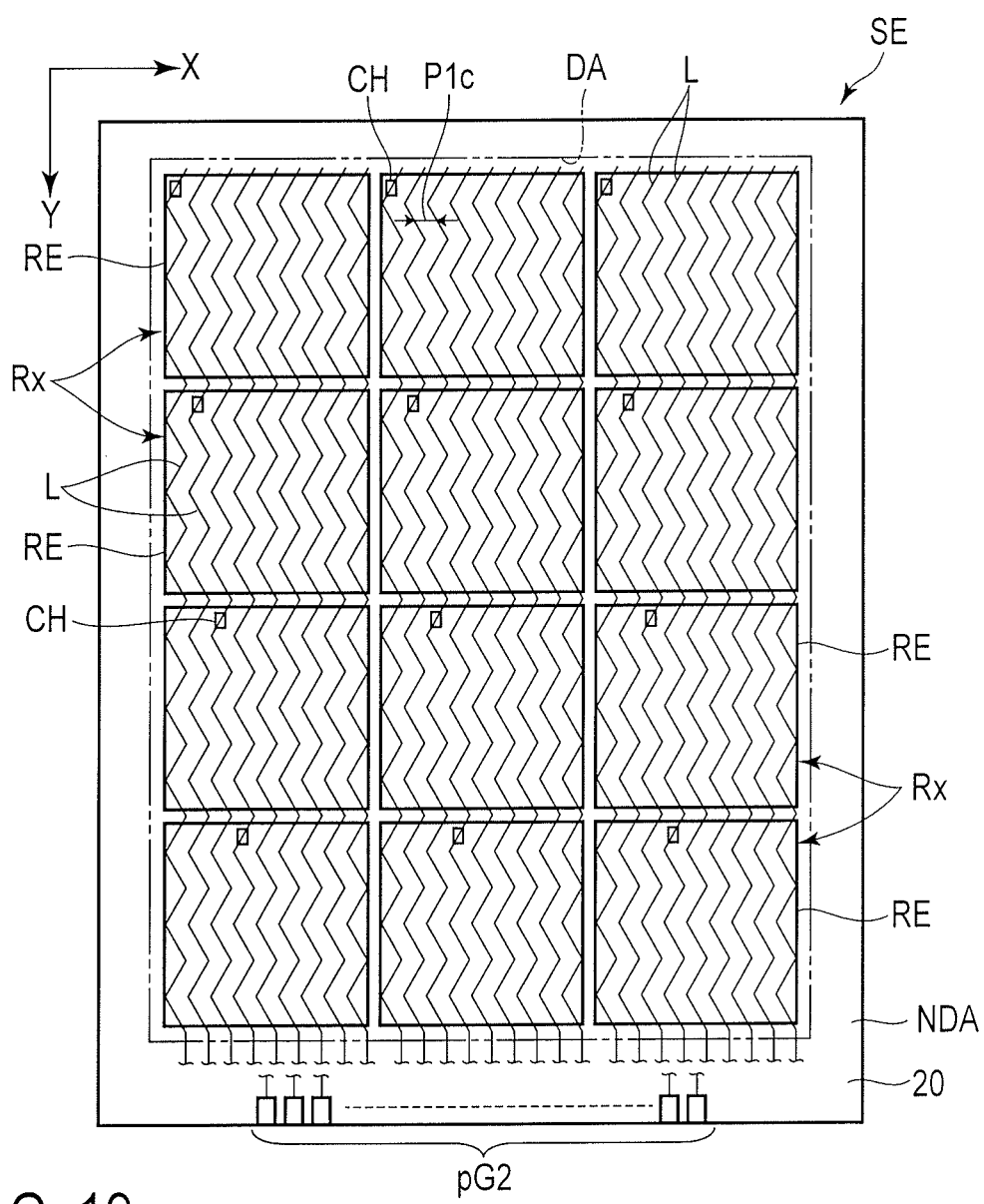
FIG. 19 is a plan view which schematically illustrates an electrostatic capacitance-type sensor according to a third embodiment, FIG. 19 being a view illustrating a layout of detection electrodes, lead lines and dummy lines.

Next, a detailed description is given of an electrostatic capacitance-type sensor-equipped liquid crystal display device DSP and a method of driving the liquid crystal display device DSP according to a third embodiment. FIG. 19 is a plan view which schematically illustrates an electrostatic capacitance-type sensor SE of the liquid crystal display device DSP according to the present embodiment, FIG. 19 being a view illustrating a layout of detection electrodes Rx, lead lines L and dummy lines DL.

As illustrated in FIG. 19, the liquid crystal display device DSP according to this embodiment is formed like the above-described liquid crystal display device of the first embodiment, except that an interlayer insulation film II is added to the sensor SE, and the layout of the sensor SE is different.

Detection electrodes Rx are arranged in the first direction X and second direction Y, and are disposed in a matrix. The detection electrode Rx is formed of a transparent electrode RE alone. In this embodiment, the sizes of plural transparent electrodes RE are uniform. In the example illustrated, each of the transparent electrode RE is formed in a rectangular shape, but the shape thereof is not limited to this example.

Lead lines L are disposed to be arranged in the first direction X. The lead lines L are opposed to the plural transparent electrodes RE which are arranged in the second direction Y. In the example illustrated, each lead line L has a wavy shape which obliquely crosses the first direction X, but the shape thereof is not limited to this example.

In addition, it is preferable that lead lines L neighboring in the first direction X are arranged with an equal pitch in the first direction X. Alternatively, it is preferable that a pitch P1c of lead lines L in the first direction X is an integer-number of times of the pixel pitch in the first direction X. The pixel pitch, too, in this context, corresponds to, for example, the pitch Pu of pixels PX shown in FIG. 4.

Figure 20:
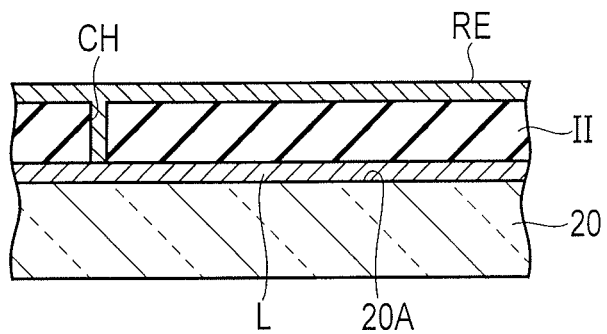
FIG. 20 is a cross-sectional view which schematically illustrates a part of the electrostatic capacitance-type sensor illustrated in FIG. 19.

FIG. 20 is a cross-sectional view which schematically illustrates a part of the electrostatic capacitance-type sensor SE illustrated in FIG. 19. As illustrated in FIG. 20, the electrostatic capacitance-type sensor SE further includes an interlayer insulation film II. The interlayer insulation film II is provided between the plural lead lines L and plural transparent electrodes RE.

In this embodiment, the lead lines L are formed on the outer surface 20A of the second insulative substrate 20. The interlayer insulation film II is formed on the outer surface 20A of the second insulative substrate 20, on which the lead lines L are formed. A plurality of contact holes CH are formed in the interlayer insulation film II. Each contact hole CH exposes one lead line L. The transparent electrodes RE are formed on the interlayer insulation film II. The transparent electrode RE extends through the associated contact hole CH, and comes in contact with one associated lead line L.

According to the electrostatic capacitance-type sensor-equipped liquid crystal display device DSP and the method of driving the same of the third embodiment, which is constructed as described above, the liquid crystal display device DSP includes the liquid crystal display panel PNL with a display surface which displays an image, the electrostatic capacitance-type sensor SE provided on the liquid crystal display panel PNL, and the control module CM. Thus, in this embodiment, too, the same advantageous effects as obtained in the first embodiment can be obtained.

The sensor SE includes the interlayer insulation film II. The lead lines L and transparent electrodes RE are provided, with the interlayer insulation film II being interposed. Only the transparent electrodes RE can be disposed on the interlayer insulation film II. Specifically, since the transparent electrodes RE can efficiently be disposed, the efficiency of use of space can be enhanced.

From the above, it is possible to obtain the electrostatic capacitance-type sensor-equipped liquid crystal display device DSP and the method of driving the same with excellent detection precision of input position information.

Modification of Third Embodiment

Next, a description is given of a modification of the electrostatic capacitance-type sensor SE according to the above-described third embodiment. The positions of the detection electrodes Rx and lead lines L may be reversed. In this case, the transparent electrodes RE are formed on the outer surface 20A of the second insulative substrate 20, and the lead lines L are formed on the interlayer insulation film II. In this modification, too, the same advantageous effects as obtained in the third embodiment can be obtained. However, taking into account the corrosion of metal lines (lead lines L), it is preferable that the metal lines (lead lines L) are located below the transparent electrodes RE and interlayer insulation film II, as in the above-described third embodiment, rather than in the present modification.

Fourth Embodiment

Next, a detailed description is given of an electrostatic capacitance-type sensor-equipped liquid crystal display device DSP and a method of driving the liquid crystal display device DSP according to a fourth embodiment. FIG. 21 is a timing chart for explaining a method of driving the liquid crystal display device DSP according to the present embodiment, FIG. 21 being a view illustrating a video signal Vsig, a write signal Vw and a read signal Vr. The liquid crystal display device DSP according to this embodiment is formed like the above-described liquid crystal display device of the first embodiment. The liquid crystal display panel PNL and sensor SE are driven under the control of the control module CM.

As illustrated in FIG. 21, in this embodiment, the control module CM repeatedly executes, in a 1-frame (1F) period, a display operation which is executed in a display operation period Pd, and an input position information detection operation which is executed in an input position information detection period Ps that does not overlap the display operation period Pd. The input position information detection period Ps is, for example, a blanking period. Examples of the blanking period include a horizontal blanking period and a vertical blanking period.

During the display operation period Pd, a control signal is delivered to the gate line G from the gate line driving circuit GD, a video signal Vsig is delivered to the source line S from the source line driving circuit SD, and a common voltage Vcom is applied to the common electrode CE (divisional electrode C) from the common electrode driving circuit CD, thereby driving the liquid crystal display panel PNL. Since the liquid crystal display panel PNL includes the multiplexer MU1, the source lines S are driven in a time-division manner.

It is possible to detect input position information by driving the sensor SE during the period in which are written the signals (video signal Vsig, control signal, common voltage Vcom) in the pixel PX. However, the influence of noise, which is exerted on the sensor SE by the liquid crystal display panel PNL during the period in which the signals are written in the pixel PX, is very large in general. Thus, the detection with very high sensitivity is enabled by executing sensing by the sensor SE after the write of signals (video signal Vsig, etc.) in the pixel PX is stopped.

During the input position information detection period Ps, the input of the control signal, video signal Vsig and common voltage Vcom to the liquid crystal display panel PNL is stopped, and the sensor SE is driven. When the sensor SE is driven, the control module CM writes a write signal Vw in the detection electrode Rx, reads a read signal Vr which is indicative of a variation in electrostatic capacitance occurring in the detection electrode Rx in which the write signal Vw has been written, and determines input position information, based on the variation in electrostatic capacitance.

According to the electrostatic capacitance-type sensor-equipped liquid crystal display device DSP and the method of driving the liquid crystal display device DSP of the fourth embodiment, which is constructed as described above, the liquid crystal display device DSP is formed like the above-described liquid crystal display device of the first embodiment. Thus, in this embodiment, too, the same advantageous effects as obtained in the first embodiment can be obtained.

From the above, it is possible to obtain the electrostatic capacitance-type sensor-equipped liquid crystal display device DSP and the method of driving the same with excellent detection precision of input position information.

Modification of Fourth Embodiment

Next, a detailed description is given of a modification of the method of driving the liquid crystal display device DSP according to the above-described fourth embodiment. FIG. 22 is a timing chart for explaining the modification of the method according to the fourth embodiment, FIG. 22 being a view illustrating a video signal Vsig, a common voltage Vcom, a potential adjustment signal Va, a write signal Vw and a read signal Vr.

As illustrated in FIG. 22, during a 1-frame (1F) period of this modification, a display operation is executed in a display operation period Pd of the first half, and an input position information detection operation is executed in an input position information detection period Ps of the second half.

In the input position information detection period Ps, the control module CM writes a potential adjustment signal Va, which has the same waveform as a write signal Vw which is written in the sensor SE (detection electrode Rx), in the common electrode CE in synchronism with the write signal Vw. In this case, the same waveform means that the write signal Vw and potential adjustment signal Va are identical with respect to the phase, amplitude and cycle.

For example, the control module CM delivers a sync signal to the driving IC chip IC1 and driving IC chip IC2, thus being able to synchronize the write signal Vw and potential adjustment signal Va. Alternatively, the driving IC chip IC2 delivers a pulse-shaped timing signal, which notifies a driving (scanning) timing of the sensor SE, to the driving IC chip IC1, thus being able to synchronize the write signal Vw and potential adjustment signal Va.

In the modification of the method of driving the liquid crystal display device DSP according to the fourth embodiment, which is constructed as described above, the same advantageous effects as obtained in the fourth embodiment can be obtained.

In the input position information detection period Ps, the potential adjustment signal Va, which has the same waveform as the write signal Vw, is written in the common electrode CE in synchronism with the write signal Vw. Thereby, since the period Ps, in which a parasitic capacitance that is formed between the detection electrode Rx and the common electrode CE is eliminated, can be provided, the sensor SE can be better driven, and the precision of detection of input position information can be further enhanced.

Fifth Embodiment

Figure 23:
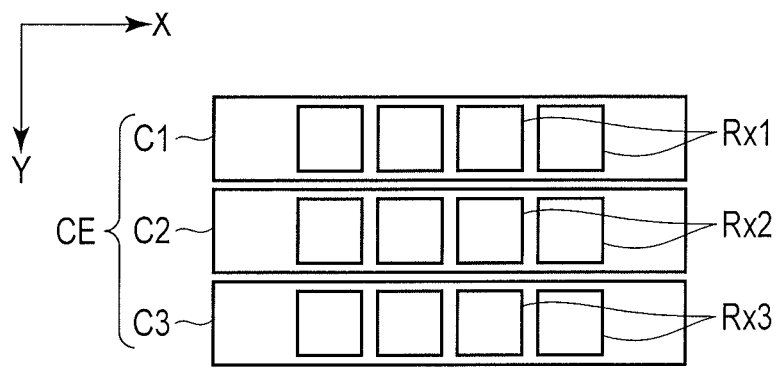
FIG. 23 is a view for explaining a method of driving an electrostatic capacitance-type sensor-equipped liquid crystal display device according to a fifth embodiment, FIG. 23 being a plan view illustrating a plurality of divisional electrodes and a plurality of detection electrodes.

Next, a detailed description is given of an electrostatic capacitance-type sensor-equipped liquid crystal display device DSP and a method of driving the liquid crystal display device DSP according to a fifth embodiment. FIG. 23 is a view for explaining the method of driving the liquid crystal display device DSP according to the present embodiment, FIG. 23 being a plan view illustrating a plurality of divisional electrodes C and a plurality of detection electrodes Rx.

As illustrated in FIG. 23, in this embodiment, the common electrode CE includes a first divisional electrode C1, a second divisional electrode C2, and a third divisional electrode C3. A plurality of first detection electrodes Rx1 are opposed to the first divisional electrode C1, a plurality of second detection electrodes Rx2 are opposed to the second divisional electrode C2, and a plurality of third detection electrodes Rx3 are opposed to the third divisional electrode C3.

The liquid crystal display device DSP according to this embodiment is basically formed like the above-described liquid crystal display device of the first embodiment. The liquid crystal display panel PNL and sensor SE are driven under the control of the control module CM.

Figure 24:
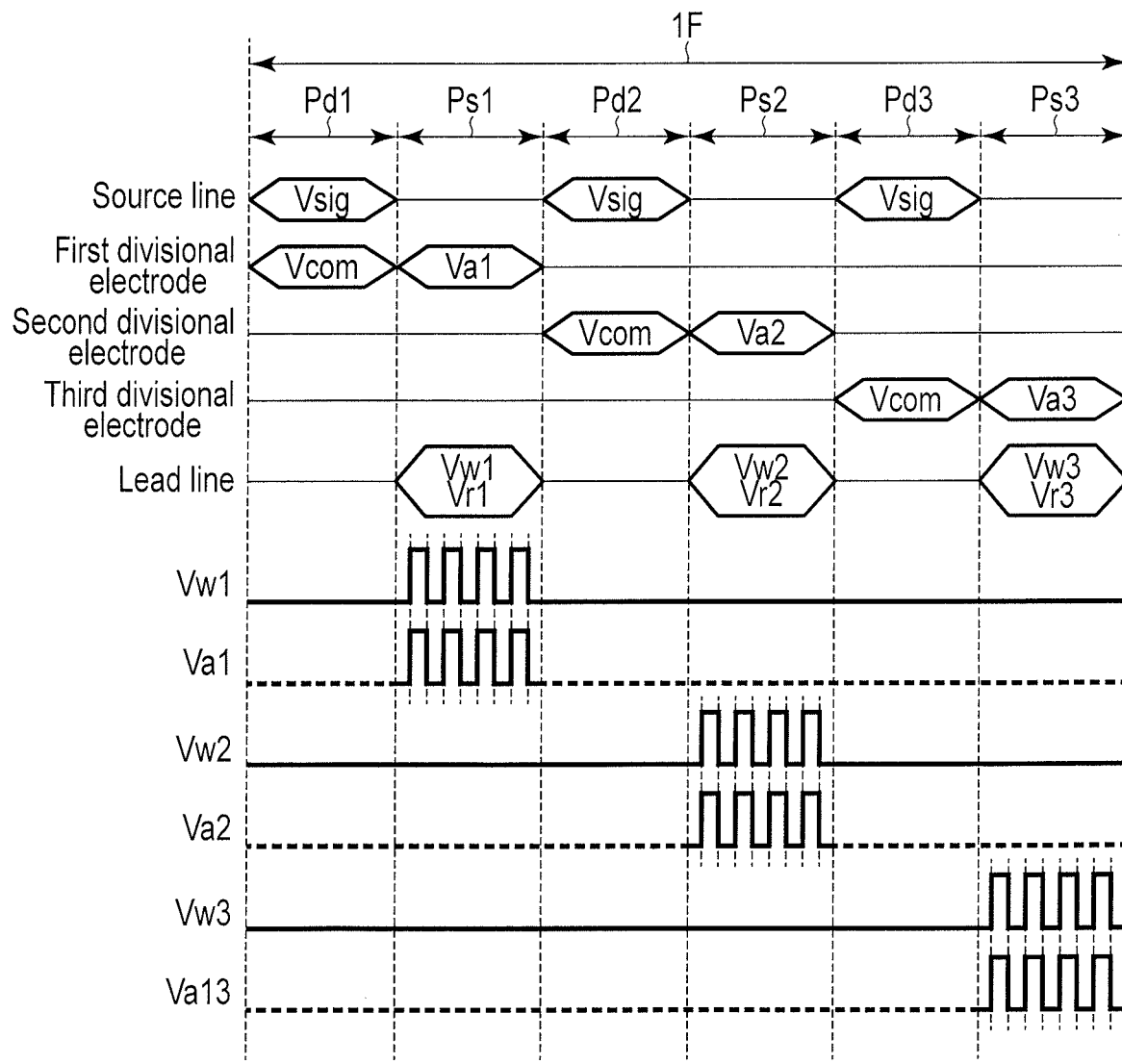
FIG. 24 is a timing chart for explaining the method according to the fifth embodiment, FIG. 24 being a view illustrating a video signal, a common voltage, a potential adjustment signal, a write signal and a read signal.

FIG. 24 is a timing chart for explaining the method of driving the liquid crystal display device DSP according to this embodiment, FIG. 24 being a view illustrating a video signal Vsig, a common voltage Vcom, a potential adjustment signal Va, a write signal Vw and a read signal Vr.

As illustrated in FIG. 24, in this embodiment, the control module CM repeatedly executes, in a 1-frame (1F) period, a display operation which is executed in a display operation period Pd, and an input position information detection operation which is executed in an input position information detection period Ps that does not overlap the display operation period Pd.

To start with, during a display operation period Pd1, a control signal is delivered to the gate line G from the gate line driving circuit GD, a video signal Vsig is delivered to the source line S from the source line driving circuit SD, and a common voltage Vcom is applied to the first divisional electrode C1 from the common electrode driving circuit CD, thereby driving the liquid crystal display panel PNL. During the display operation period Pd1, a plurality of pixels PX, which use the first divisional electrode C1, are driven.

Then, during an input position information detection period Ps1, the input of the control signal, video signal Vsig and common voltage Vcom to the liquid crystal display panel PNL is stopped, and the sensor SE is driven. When the sensor SE is driven, the control module CM writes a first write signal Vw1 only in the first detection electrodes Rx1, reads a first read signal Vr1 which is indicative of a variation in electrostatic capacitance occurring in the first detection electrodes Rx1 in which the first write signal Vw1 has been written, and determines input position information, based on the variation in electrostatic capacitance. In the input position information detection period Ps1, the control module CM writes a potential adjustment signal Va(Va2), which has the same waveform as the first write signal Vw1 which is written in the first detection electrodes Rx1, in the first divisional electrode C1 in synchronism with the first write signal Vw1.

Subsequently, during a display operation period Pd2, a control signal is delivered to the gate line G from the gate line driving circuit GD, a video signal Vsig is delivered to the source line S from the source line driving circuit SD, and a common voltage Vcom is applied to the second divisional electrode C2 from the common electrode driving circuit CD, thereby driving the liquid crystal display panel PNL. During the display operation period Pd2, a plurality of pixels PX, which use the second divisional electrode C2, are driven.

Thereafter, during an input position information detection period Ps2, the input of the control signal, video signal Vsig and common voltage Vcom to the liquid crystal display panel PNL is stopped, and the sensor SE is driven. When the sensor SE is driven, the control module CM writes a second write signal Vw2 only in the second detection electrodes Rx2, reads a second read signal Vr2 which is indicative of a variation in electrostatic capacitance occurring in the second detection electrodes Rx2 in which the second write signal Vw2 has been written, and determines input position information, based on the variation in electrostatic capacitance. In the input position information detection period Ps2, the control module CM writes a potential adjustment signal Va(Va2), which has the same waveform as the second write signal Vw2 which is written in the second detection electrodes Rx2, in the second divisional electrode C2 in synchronism with the second write signal Vw2.

Next, during a display operation period Pd3, a control signal is delivered to the gate line G from the gate line driving circuit GD, a video signal Vsig is delivered to the source line S from the source line driving circuit SD, and a common voltage Vcom is applied to the third divisional electrode C3 from the common electrode driving circuit CD, thereby driving the liquid crystal display panel PNL. During the display operation period Pd3, a plurality of pixels PX, which use the third divisional electrode C3, are driven.

Thereafter, during an input position information detection period Ps3, the input of the control signal, video signal Vsig and common voltage Vcom to the liquid crystal display panel PNL is stopped, and the sensor SE is driven. When the sensor SE is driven, the control module CM writes a third write signal Vw3 only in the third detection electrodes Rx3, reads a third read signal Vr3 which is indicative of a variation in electrostatic capacitance occurring in the third detection electrodes Rx3 in which the third write signal Vw3 has been written, and determines input position information, based on the variation in electrostatic capacitance. In the input position information detection period Ps3, the control module CM writes a potential adjustment signal Va(Va3), which has the same waveform as the third write signal Vw3 which is written in the third detection electrodes Rx3, in the third divisional electrode C3 in synchronism with the third write signal Vw3.

According to the electrostatic capacitance-type sensor-equipped liquid crystal display device DSP and the method of driving the liquid crystal display device DSP of the fifth embodiment, which is constructed as described above, the liquid crystal display device DSP is formed like the above-described liquid crystal display device of the first embodiment. Thus, in this embodiment, too, the same advantageous effects as obtained in the first embodiment can be obtained.

The potential adjustment signal Va can be delivered not to the single common electrode CE, but to the plural divisional electrodes C (C1, C2, C3) which are divided.

Thereby, the potential adjustment signal Va can be written only in the divisional electrode C, among the plural divisional electrodes C, which is opposed to the detection electrodes Rx in which the write signal Vw is written. For example, since the period Psi, in which the parasitic capacitance formed between the first detection electrodes Rx1 and first divisional electrode C1 is eliminated, can be provided, the first detection electrodes Rx1 (sensor SE) can be better driven, and the precision of detection of input position information can be further enhanced.

Besides, the common electrode CE is divided into the plural divisional electrodes C. Thereby, the following two advantageous effects can be obtained.

(1) Since the time constant of the common electrode CE can be improved, the sensor SE can be scanned at high speed, and the detection sensitivity of the sensor SE can be enhanced.

(2) The CR (time constant) of the common electrode CE decreases, and the power consumption lowers.

From the above, it is possible to obtain the electrostatic capacitance-type sensor-equipped liquid crystal display device DSP and the method of driving the same with excellent detection precision of input position information.

Modification of Fifth Embodiment

Figure 25:
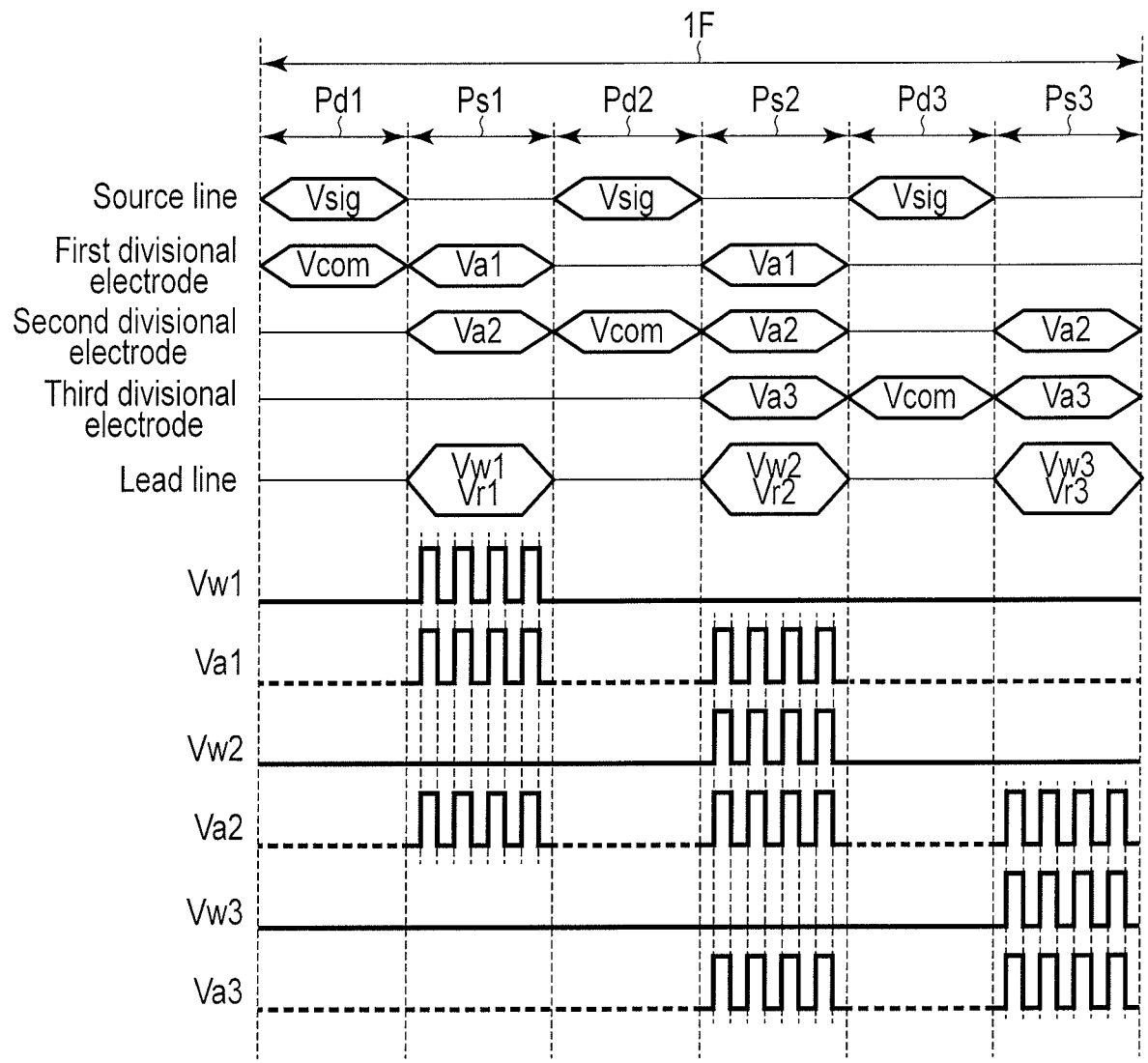
FIG. 25 is a timing chart for explaining a modification of the method according to the fifth embodiment, FIG. 25 being a view illustrating a video signal, a common voltage, a potential adjustment signal, a write signal and a read signal.

Next, a detailed description is given of a modification of the method of driving the liquid crystal display device DSP according to the above-described fifth embodiment. FIG. 25 is a timing chart for explaining a modification of the method according to the fifth embodiment, FIG. 25 being a view illustrating a video signal Vsig, a common voltage Vcom, a potential adjustment signal Va, a write signal Vw and a read signal Vr.

As illustrated in FIG. 25, during the input position information detection period Psi, the potential adjustment signal Va (Va1, Va2) is written not only in the first divisional electrode C1, but also in the second divisional electrode C2 which neighbors one side of the first divisional electrode C1.

During the input position information detection period Ps2, the potential adjustment signal Va (Va1, Va2, Va3) is written not only in the second divisional electrode C2, but also in the first divisional electrode C1 and third divisional electrode C3 which neighbor both sides of the second divisional electrode C2.

During the input position information detection period Psl, the potential adjustment signal Va (Va2, Va3) is written not only in the third divisional electrode C3, but also in the second divisional electrode C2 which neighbors one side of the third divisional electrode C3.

In this case, the first write signal Vw1, second write signal Vw2, and third write signal Vw3, and the potential adjustment signals Va1, Va2, Va3 have the same waveform.

In the modification of the method of driving the liquid crystal display device DSP according to the fifth embodiment, which is constructed as described above, the same advantageous effects as obtained in the fifth embodiment can be obtained. In addition, in this modification, it is possible to provide, for example, the period Ps1 in which not only the parasitic capacitance formed between the first detection electrodes Rx1 and the first divisional electrode C1 is eliminated, but also the parasitic capacitance formed between the first detection electrodes Rx1 and the second divisional electrode C2 is eliminated. Therefore, the first detection electrodes Rx1 (sensor SE) can be better driven, and the precision of detection of input position information can be further enhanced.

Sixth Embodiment

Figure 26:
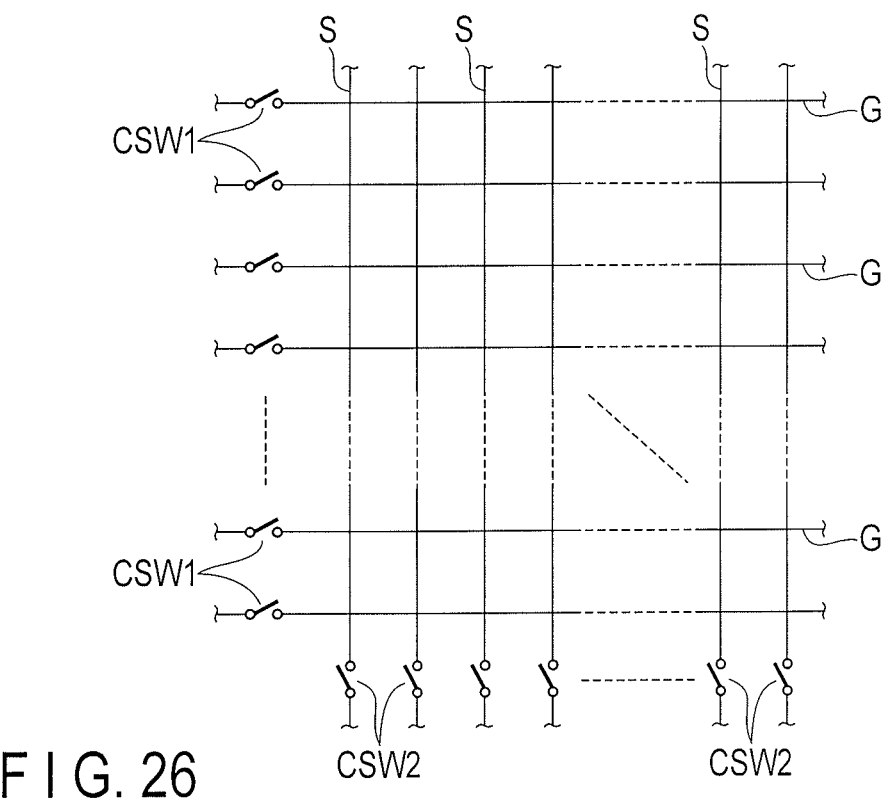
FIG. 26 is a view for explaining a method of driving an electrostatic capacitance-type sensor-equipped liquid crystal display device according to a sixth embodiment, FIG. 26 being a view illustrating a state in which control switching elements connected to gate lines and control switching elements connected to source lines are all turned off.

Next, a detailed description is given of an electrostatic capacitance-type sensor-equipped liquid crystal display device DSP and a method of driving the liquid crystal display device DSP according to a sixth embodiment. The liquid crystal display device DSP according to this embodiment is formed like the liquid crystal display device according to the first embodiment. FIG. 26 is a view for explaining the method of driving the electrostatic capacitance-type sensor-equipped liquid crystal display device DSP according to the present embodiment, FIG. 26 being a view illustrating a state in which control switching elements CSW1 connected to gate lines G and control switching elements CSW2 connected to source lines S are all turned off.

As illustrated in FIG. 26, during the input position information detection period, the control module CM turn off the control switching elements CSW1 and control switching elements CSW2, and switches the gate lines G and source lines S to an electrically floating state.

According to the electrostatic capacitance-type sensor-equipped liquid crystal display device DSP and the method of driving the liquid crystal display device DSP of the sixth embodiment, which is constructed as described above, the liquid crystal display device DSP is formed like the above-described liquid crystal display device of the first embodiment. Thus, in this embodiment, too, the same advantageous effects as obtained in the first embodiment can be obtained.

During the input position information detection period, the gate lines G and source lines S can be switched to the electrically floating state. It is possible to provide the input position information detection period during which the parasitic capacitance (floating capacitance), which is undesirably formed between the common electrode CE and the gate lines G and between the common electrode CE and the source lines S, is reduced. Specifically, during the input position information detection period, the resistance of the common electrode CE can be reduced and, for example, high-speed driving of the common electrode CE by the potential adjustment signal Va is enabled. Thus, during the input position information detection period, the sensor SE and common electrode CE can be well driven, and the precision of detection of input position information can be enhanced.

From the above, it is possible to obtain the electrostatic capacitance-type sensor-equipped liquid crystal display device DSP and the method of driving the same with excellent detection precision of input position information.

Modification of Sixth Embodiment

The present modification differs from the example illustrated in the sixth embodiment in that control switching elements, which are connected between the common electrode CE and source lines S, are added to the liquid crystal display panel PNL. Under the control of the control module CM, the driving IC chip IC1 turns on or off the above-described control switching elements, and can switch the common electrode CE and source lines S to a conductive state or a non-conductive state. During the display operation period, these control switching elements are turned off. For example, during the input position information detection period, by turning on the above-described control switching elements, the common electrode CE and source lines S can be short-circuited and the common electrode CE and source lines S can be set at the same potential. For example, the potential adjustment signal Va is delivered to the source lines S through the common electrode CE.

From the above, in this modification, compared to the above-described sixth embodiment, the resistance of the common electrode CE during the input position information detection period can be further reduced.

Seventh Embodiment

Figure 27:
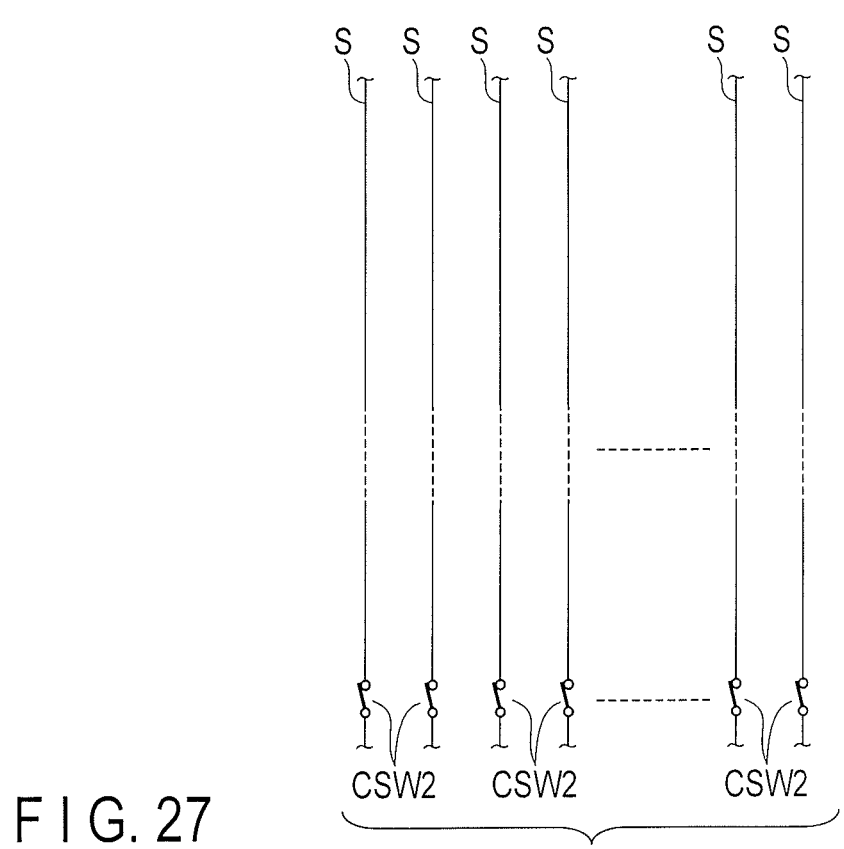

Next, a detailed description is given of an electrostatic capacitance-type sensor-equipped liquid crystal display device DSP and a method of driving the liquid crystal display device DSP according to a seventh embodiment. The liquid crystal display device DSP according to this embodiment is formed like the liquid crystal display device according to the first embodiment. FIG. 27 is a view for explaining the method of the electrostatic capacitance-type sensor-equipped liquid crystal display device DSP according to the present embodiment, FIG. 27 being a view illustrating a state in which control switching elements CSW2 connected to source lines S are all turned on. Incidentally, the control switching elements CSW1 connected to the gate lines G are all turned off.

As illustrated in FIG. 27, during the input position information detection period, the control module CM turns on all the control switching elements CSW2.

FIG. 28 is a timing chart for explaining the method according to this embodiment, FIG. 28 being a view illustrating a video signal Vsig, a common voltage Vcom, a potential adjustment signal Va, a write signal Vw and a read signal Vr. As illustrated in FIG. 28, during the input position information detection period Ps, the potential adjustment signal Va is synchronously written not only in the common electrode CE (divisional electrodes C), but also in all the source lines S.

In the meantime, as illustrated in the above-described modification of the sixth embodiment, the resistance of the common electrode CE becomes lower if the common electrode CE and source lines S are short-circuited, and the high-speed driving of the common electrode CE is enabled.

According to the electrostatic capacitance-type sensor-equipped liquid crystal display device DSP and the method of driving the liquid crystal display device DSP of the seventh embodiment, which is constructed as described above, the liquid crystal display device DSP is formed like the above-described liquid crystal display device of the first embodiment. Thus, in this embodiment, too, the same advantageous effects as obtained in the first embodiment can be obtained.

During the input position information detection period Ps, the potential adjustment signal Va, which has the same waveform as the write signal Vw, is written not only in the common electrode CE, but also in all the source lines S, in synchronism with the write signal Vw. Thereby, it is possible to provide the input position information detection period Ps during which the parasitic capacitance, which is undesirably formed between the detection electrodes Rx and the common electrode CE and between the common electrode CE and the source lines S, is eliminated. Specifically, during the input position information detection period Ps, the resistance of the common electrode CE can be reduced and, for example, high-speed driving of the common electrode CE by the potential adjustment signal Va is enabled. Thus, the sensor SE and common electrode CE can be better driven, and the precision of detection of input position information can be further enhanced.

From the above, it is possible to obtain the electrostatic capacitance-type sensor-equipped liquid crystal display device DSP and the method of driving the same with excellent detection precision of input position information.

Modification 1 of Seventh Embodiment

Next, a detailed description is given of Modification 1 of the method of the liquid crystal display device DSP according to the above-described seventh embodiment. During the input position information detection period Ps, the control module CM may turn on all the control switching elements CSW1, instead of the control switching elements CSW2. During the input position information detection period Ps, the potential adjustment signal Va, which has the same waveform as the write signal Vw, can be written not only in the common electrode CE, but also in the gate lines G, in synchronism with the write signal Vw. Thereby, it is possible to provide the input position information detection period Ps during which the parasitic capacitance, which is formed between the detection electrodes Rx and the common electrode CE and between the common electrode CE and the gate lines G, is eliminated.

Modification 2 of Seventh Embodiment

Next, a detailed description is given of Modification 2 of the method of the liquid crystal display device DSP according to the above-described seventh embodiment. During the input position information detection period Ps, the control module CM may turn on all the control switching elements CSW1, as well as the control switching elements CSW2. During the input position information detection period Ps, the potential adjustment signal Va, which has the same waveform as the write signal Vw, can be written not only in the common electrode CE, but also in the source lines S and gate lines G, in synchronism with the write signal Vw. Thereby, it is possible to provide the input position information detection period Ps during which the parasitic capacitance, which is formed between the detection electrodes Rx and the common electrode CE, between the common electrode CE and the source lines S, and between the common electrode CE and the gate lines G, is eliminated.

Eighth Embodiment

Next, a detailed description is given of an electrostatic capacitance-type sensor-equipped liquid crystal display device DSP and method of driving the liquid crystal display device DSP according to an eighth embodiment. FIG. 29 is a circuit diagram illustrating a part of the electrostatic capacitance-type sensor-equipped liquid crystal display device DSP according to this embodiment, FIG. 29 being a plan view illustrating an electrostatic capacitance-type sensor SE, a multiplexer MU2, and a plurality of detectors DE.

As illustrated in FIG. 29, the liquid crystal display device DSP according to this embodiment is formed like the above-described liquid crystal display device according to the first embodiment, except that the multiplexer MU2 is added, and the number (scale) of detectors DE is reduced. Incidentally, each detector DE corresponds to the circuit configuration illustrated in FIG. 10A. For example, the multiplexer MU2 and the plural detectors DE are provided in the driving IC chip IC2 illustrated in FIG. 1 and are connected between the sensor SE and the control module CM. In the meantime, the multiplexer MU2 and the plural detectors DE may be provided at a location other than the driving IC chip IC2, such as in the control module CM.

In this case, it is preferable that the common electrode CE is dividedly formed in accordance with the detection method of the multiplexer MU2.

The multiplexer MU2 is connected between the sensor SE and the detectors DE. Under the control of the control module CM, the multiplexer MU2 distributively writes a write signal Vw, which is transmitted from the plural detectors DE, in the plural detection electrodes Rx. In addition the multiplexer MU2 transmits a read signal Vr, which is selectively read from the plural detection electrodes Rx, to the plural detectors DE.

As the multiplexer MU2, various kinds of multiplexers, such as a ½ multiplexer or a ⅓ multiplexer, can be used. For example, when the ⅓ multiplexer is used as the multiplexer MU2, the number of detectors DE is ⅓ of the number of lead lines L (the number of detection electrodes Rx).

According to the electrostatic capacitance-type sensor-equipped liquid crystal display device DSP and the method of driving the liquid crystal display device DSP of the eighth embodiment, which is constructed as described above, the liquid crystal display device DSP is formed like the liquid crystal display device of the first embodiment, except for the multiplexer MU2 and plural detectors DE. Thus, in this embodiment, too, the same advantageous effects as obtained in the first embodiment can be obtained.

The sensor SE is connected to the multiplexer MU2. Thus, by disposing the detection electrodes Rx in a matrix, the number of detectors DE can be reduced even if the number of detection electrodes Rx increases.

From the above, it is possible to obtain the electrostatic capacitance-type sensor-equipped liquid crystal display device DSP and the method of driving the same with excellent detection precision of input position information.

Ninth Embodiment

Next, a detailed description is given of an electrostatic capacitance-type sensor-equipped liquid crystal display device DSP and a method of driving the liquid crystal display device DSP according to a ninth embodiment. FIG. 30 is a plan view which schematically illustrates a structure of an electrostatic capacitance-type sensor SE according to this embodiment.

As illustrated in FIG. 30, the liquid crystal display device DSP according to this embodiment is formed like the above-described liquid crystal display device of each of the embodiments, except that a plurality of counter-electrodes Tx are added to the sensor SE, and the layout of the sensor SE is different.

Detection electrodes Rx are disposed in the display area DA such that they are arranged in the first direction X. The detection electrodes Rx are formed of only metal lines. In the example illustrated, each detection electrode Rx has a wavy shape which obliquely crosses the first direction X, but the shape thereof is not limited to this example. In addition, the detection electrodes Rx are led out to the non-display area NDA and are connected to the OLB pad group pG2. These electrodes Rx are linearly formed of a metal.

In this embodiment, too, it is preferable that detection electrodes Rx neighboring in the first direction X are arranged with an equal pitch in the first direction X. Besides, it is preferable that the pitch of detection electrodes Rx in the first direction X is an integer-number of times of the pixel pitch in the first direction X. The pixel pitch, in this context, corresponds to, for example, the pitch Pu of pixels PX shown in FIG. 4.

The counter-electrodes Tx are formed in strip shapes and extend substantially linearly in the first direction X. The counter-electrodes Tx are arranged at intervals in the second direction Y. The counter-electrodes Tx are opposed to the plural detection electrodes Rx. The counter-electrodes Tx are formed of a transparent, electrically conductive material such as ITO or IZO.

The sensor SE includes lead lines Lt. The lead lines Lt are formed of a metal and are provided in the non-display area NDA. The lead lines Lt are connected to the counter-electrodes Tx and OLB pad group pG2.

FIG. 31 is a cross-sectional view which schematically illustrates a structure at a time when the electrostatic capacitance-type sensor illustrated in FIG. 30 is cut along line XXXI-XXXI. As illustrated in FIG. 31, the sensor SE further includes an interlayer insulation film II. The interlayer insulation film II is provided between the counter-electrodes Tx and the metal lines (detection electrodes Rx, lead lines Lt).

In this embodiment, the counter-electrodes Tx are formed on the outer surface 20A of the second insulative substrate 20. The interlayer insulation film II is formed on the outer surface 20A of the second insulative substrate 20, on which the counter-electrodes Tx are formed. The detection electrodes Rx and lead lines Lt are formed above the outer surface 20A of the second insulative substrate 20, on which the interlayer insulation film II is formed.

According to the electrostatic capacitance-type sensor-equipped liquid crystal display device DSP and the method of driving the liquid crystal display device DSP of the ninth embodiment, which is constructed as described above, the sensor SE includes the detection electrodes Rx which extend in the second direction Y, and the counter-electrodes Tx which extend in the first direction X and are opposed to the detection electrodes Rx. Under the control of the control module CM, the write signal Vw can be written in the counter-electrodes Tx, and the read signal Vr can be read from the detection electrodes Rx. Thereby, the sensor SE can determine the input position information by the mutual-capacitive sensing method.

From the above, in this embodiment, too, it is possible to obtain the electrostatic capacitance-type sensor-equipped liquid crystal display device DSP and the method of driving the same with excellent detection precision of input position information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the plural detection electrodes Rx, which are provided in a matrix, may form a plurality of detection electrode groups. Each of the plural detection electrode groups includes a plurality of detection electrodes Rx arranged in the second direction Y, and the plural detection electrode groups are arranged in the first direction X. Under the control of the control module CM, after read signals Vr have been read by the mutual-capacitive sensing method, plural read signals Vr which have been read from each detection electrode group may be bundled into one signal. The signals can be bundled by utilizing conventionally known techniques.

All kinds of electrostatic capacitance-type sensors, which can be practiced by a skilled person by making proper design changes, based on the detection electrode Rx, transparent electrode RE, dummy electrode DR, lead line L, dummy line DL, interlayer insulation film II, etc., which have been described above as embodiments of the present invention, belong to the scope of the present invention as far as such sensors include the gist of the invention.

Besides, the divisional electrodes C may extend in the second direction Y, and arranged at intervals in the first direction X.

In the above-described embodiments, as the display device and the method of driving the display device, liquid crystal display devices and methods of driving the liquid crystal display devices have been disclosed by way of example. However, the display devices according to the embodiments may be exemplified by all kinds of flat-panel display devices, such as organic EL (electroluminescent) display devices, other self-luminous display devices, electronic paper-type display devices including electrophoresis elements, etc. Needless to say, the above-described embodiments are applicable to display devices ranging from small/middle-sided display devices to large-sized display devices, without particular restrictions.

What is claimed is:

1. An electrostatic capacitance-type sensor-equipped display device comprising:
   a display panel with a substrate including a display surface that displays an image;
   an electrostatic capacitance-type sensor arranged on the display panel; and
   an insulator,
   wherein
   the electrostatic capacitance-type sensor includes:
      a plurality of detection electrodes disposed in a matrix,
         each of the detection electrodes including a transparent electrode which is formed of a transparent, electrically conductive material; and
      a plurality of metal lines located on the substrate, and respectively connected to the detection electrodes in a one-to-one correspondence, the detection electrodes are separated from each other, do not overlap with each other, and include detection electrodes of a first group and detection electrodes of a second group,
   the detection electrodes of the first group are arranged in a first direction,
   the detection electrodes of the second group are arranged in a second direction intersecting with the first direction,
   the metal lines are located between the substrate and the transparent electrodes,
   the insulator is located between the metal lines and the transparent electrodes,
   each of the metal lines is connected to a corresponding one of the transparent electrodes through a corresponding one of contact holes in the insulator,
   the contact holes corresponding to the detection electrodes of the first group are arranged in a line in the first direction,
   the contact holes corresponding to the detection electrodes of the second group are not arranged in a line in the second direction, and
   positions of the contact holes corresponding to the detection electrodes of the second group shift in the first direction sequentially.

2. The electrostatic capacitance-type sensor-equipped display device of claim 1, wherein
   the metal lines are directly formed on the display surface.

3. The electrostatic capacitance-type sensor-equipped display device of claim 2, wherein
   each of the metal lines is in contact with corresponding one of the transparent electrodes at an entirety of a region where each of the metal lines is opposed to the corresponding one of the transparent electrodes.

4. cmThe electrostatic capacitance-type sensor-equipped display device of claim 1,
   wherein
   the metal lines include a first metal line extending in the second direction and a second metal line extending in the second direction, and
   the electrostatic capacitance-type sensor further includes a dummy line located between the first metal line and the second metal line.

5. The electrostatic capacitance-type sensor-equipped display device of claim 1, further comprising:
   a control module connected to the metal lines,
   wherein
   the control module is configured to write a write signal in each of the detection electrodes, to read a read signal, which is indicative of a variation in electrostatic capacitance occurring in each of the detection electrodes in which the write signal has been written, and to determine input position information, based on the variation in electrostatic capacitance.

6. The electrostatic capacitance-type sensor-equipped display device of claim 1, wherein
   the display panel comprises a plurality of pixel electrodes and a plurality of divisional electrodes opposed to the pixel electrodes.

7. The electrostatic capacitance-type sensor-equipped display device of claim 6, wherein
   a touch detection signal is provided to at least one of the divisional electrodes to form the electrostatic capacitance with the detection electrode to detect touch.

8. The electrostatic capacitance-type sensor-equipped display device of claim 7, further comprising:
a control module connected to the metal lines,
wherein
the control module is configured to write a write signal in the divisional electrodes, to read a read signal, which is indicative of a variation in electrostatic capacitance occurring in each of the detection electrodes in which electrostatic capacitance has been formed, and to determine input position information, based on the variation in the electrostatic capacitance.

* * * * *